US012421777B2

(12) United States Patent
Taylor et al.

(10) Patent No.: US 12,421,777 B2
(45) Date of Patent: Sep. 23, 2025

(54) HINGE PIN KEEPER AND ENCLOSURE WITH AMBIDEXTROUS LIFT OFF-HINGE

(71) Applicant: Integra Enclosures, Limited, Mentor, OH (US)

(72) Inventors: Zachary Taylor, Willowick, OH (US); Rich Palin, Mentor, OH (US)

(73) Assignee: Integra Enclosures, Limited, Mentor, OH (US)

( * ) Notice: Subject to any disclaimer, the term of this patent is extended or adjusted under 35 U.S.C. 154(b) by 192 days.

(21) Appl. No.: 18/086,613

(22) Filed: Dec. 21, 2022

(65) Prior Publication Data

US 2023/0193673 A1 Jun. 22, 2023

Related U.S. Application Data

(60) Provisional application No. 63/291,959, filed on Dec. 21, 2021.

(51) Int. Cl.

*E05D 7/00* (2006.01)
*E05D 3/02* (2006.01)
*E05D 5/12* (2006.01)
*E05D 5/14* (2006.01)
*E05D 7/02* (2006.01)

(Continued)

(52) U.S. Cl.

CPC ............... *E05D 5/128* (2013.01); *E05D 3/02* (2013.01); *E05D 7/02* (2013.01); *E05D 7/12* (2013.01); *E05D 11/1007* (2013.01)

(58) Field of Classification Search

CPC ......... E05B 65/006; E05D 3/02; E05D 5/128; E05D 7/02; E05D 7/12; E05D 11/1007; H02G 3/088; H02G 3/14; H01R 13/5213; E05Y 2900/208; E05Y 2900/132; E05Y 2900/20; E05Y 2900/531; E05Y 2800/174; H01H 71/025; H02B 1/38; H02B 1/40; H02B 1/44; H02B 1/46; H02B 1/565

USPC .......... 16/361; 49/382; 174/50, 58; 220/845, 220/3.8, 315

See application file for complete search history.

(56) References Cited

U.S. PATENT DOCUMENTS 61,458 A * 1/1867 Rankin ..................... E05D 5/16 16/273
676,486 A * 6/1901 Beaver ..................... F16J 13/02 220/811

(Continued)

OTHER PUBLICATIONS

McMaster-Carr Catalog—Right Angle Latch style Toggle Clamps https://www.mcmaster.com/products/right-angle-toggle-clamps/ (Year: 2024).*

(Continued)

*Primary Examiner* — Gideon R Weinerth
(74) *Attorney, Agent, or Firm* — Wegman Hessler Valore

(57) ABSTRACT

Disclosed is a hinge pin keeper having a hook on a first end of a shaft and a coil on a second end of the shaft. Also disclosed is an enclosure with an ambidextrous lift-off hinge, wherein said liftoff hinge connections between the door and the base permit the handedness of the door mounting to be changed without the use of tools by lifting said door in a first handedness configuration, rotating said door 180 degrees relative to said base, and mounting said door back on said hinges in a second handedness configuration, with said first handedness configuration being the opposite of said second handedness configuration.

6 Claims, 32 Drawing Sheets

(51) Int. Cl.

| | |
|---|---|
| ***E05D 7/10*** | (2006.01) |
| ***E05D 7/12*** | (2006.01) |
| ***E05D 11/10*** | (2006.01) |

(56) References Cited

U.S. PATENT DOCUMENTS

| | | | | | |
|---|---|---|---|---|---|
| 743,279 | A * | 11/1903 | Haycock | E05D 3/02 | 16/265 |
| 851,598 | A * | 4/1907 | La Paugh | H02G 3/14 | 220/3.8 |
| 1,923,939 | A * | 8/1933 | Lavarack | H02G 3/16 | 174/59 |
| 2,041,850 | A * | 5/1936 | Melick | E05D 7/00 | 16/262 |
| 2,488,688 | A * | 11/1949 | Simmons | E05D 11/1007 | 108/45 |
| 2,656,948 | A * | 10/1953 | McGee | H01H 85/2045 | 312/100 |
| 2,748,420 | A * | 6/1956 | Clover | E05D 7/02 | 16/265 |
| 3,431,591 | A * | 3/1969 | Betso | E05D 7/105 | 16/265 |
| 3,468,577 | A * | 9/1969 | Mazerka | E05B 65/006 | 220/325 |
| 3,654,663 | A * | 4/1972 | Algotsson | H01H 9/04 | 16/230 |
| 3,666,134 | A * | 5/1972 | Rauch | H05K 7/1427 | 292/256.75 |
| 4,858,274 | A * | 8/1989 | Harrison | E05D 7/1044 | 16/265 |
| D303,491 | S * | 9/1989 | Bisbing | D8/323 | |
| 4,993,963 | A * | 2/1991 | Pedigo | H01R 13/447 | 174/67 |
| 5,150,500 | A * | 9/1992 | Bisbing | E05D 7/04 | 16/265 |
| 5,259,091 | A * | 11/1993 | Mordick | E05D 7/12 | 16/382 |
| 5,355,556 | A * | 10/1994 | Lyon | E05D 7/02 | 16/265 |
| 5,590,441 | A * | 1/1997 | Spencer | E05D 5/062 | 16/265 |
| 5,624,170 | A * | 4/1997 | Hasty | E05D 7/123 | 16/382 |
| 5,722,121 | A * | 3/1998 | Lau | E05D 5/128 | 16/389 |
| 5,806,144 | A * | 9/1998 | Fries | E05D 7/12 | 16/246 |
| 5,940,937 | A * | 8/1999 | Churchill | H02B 1/40 | 16/229 |
| 6,019,223 | A * | 2/2000 | Harftst | A45C 13/36 | 206/320 |
| 6,065,612 | A * | 5/2000 | Rinderer | H05K 7/16 | 211/175 |
| 6,082,352 | A * | 7/2000 | Hsu | A47J 37/0664 | 16/259 |
| 6,438,800 | B1 * | 8/2002 | Narang | E05D 7/1005 | 16/229 |
| 6,721,994 | B2 * | 4/2004 | Bowman | E05D 5/065 | 16/382 |
| 7,175,313 | B2 * | 2/2007 | Bednara | H05K 5/061 | 361/674 |
| 7,552,981 | B1 * | 6/2009 | Tuniewicz | E05D 15/507 | 16/231 |
| 8,099,832 | B1 * | 1/2012 | Shuker | E05D 11/1071 | 16/375 |
| 9,450,390 | B1 * | 9/2016 | Flegel | H02G 3/14 | |
| 10,004,155 | B1 * | 6/2018 | Bier | H02B 1/32 | |
| 11,396,767 | B2 * | 7/2022 | Reuter | E05D 5/06 | |
| 11,920,392 | B1 * | 3/2024 | Krietzman | E05D 11/1014 | |
| 2002/0139555 | A1 * | 10/2002 | Dodds | H02B 1/44 | 174/50 |
| 2004/0000028 | A1 * | 1/2004 | Kim | E05D 15/505 | 16/230 |
| 2006/0156512 | A1 * | 7/2006 | Naylor | E05D 5/128 | 16/273 |
| 2006/0273621 | A1 * | 12/2006 | Shaw | E05D 7/121 | 296/146.11 |
| 2006/0289718 | A1 * | 12/2006 | Lange | H02B 1/40 | 248/475.1 |
| 2007/0143960 | A1 * | 6/2007 | Schluter | E05D 7/105 | 16/260 |
| 2008/0172947 | A1 * | 7/2008 | Matteson | E05D 7/1066 | 119/501 |
| 2008/0295285 | A1 * | 12/2008 | Clymer | E05D 7/1022 | 16/229 |
| 2011/0297351 | A1 * | 12/2011 | Vosper | H05K 7/20818 | 165/67 |
| 2013/0069511 | A1 * | 3/2013 | Westby | E05D 5/12 | 312/326 |
| 2013/0312171 | A1 * | 11/2013 | Yang | A47K 13/26 | 4/240 |
| 2014/0215760 | A1 * | 8/2014 | Mitchell | E05F 1/1223 | 16/254 |
| 2016/0164271 | A1 * | 6/2016 | Franck | H03H 7/00 | 174/480 |
| 2017/0268269 | A1 * | 9/2017 | Nicholas, III | E05D 7/1055 | |
| 2018/0030766 | A1 * | 2/2018 | Yeom | E05D 7/086 | |
| 2018/0187465 | A1 * | 7/2018 | Bertovic | E05D 5/04 | |
| 2018/0205205 | A1 * | 7/2018 | Johnson | E05F 7/02 | |
| 2020/0106247 | A1 * | 4/2020 | Dauzat | H02B 1/38 | |
| 2020/0214158 | A1 * | 7/2020 | Dauzat | H05K 5/0226 | |
| 2021/0120682 | A1 * | 4/2021 | Kondrus | H05K 5/0013 | |
| 2021/0332623 | A1 * | 10/2021 | Reuter | E05D 7/1044 | |
| 2022/0145679 | A1 * | 5/2022 | Bäumer | H02B 1/38 | |
| 2022/0212250 | A1 * | 7/2022 | Thuo | B01J 8/085 | |
| 2023/0193673 | A1 * | 6/2023 | Taylor | E05D 3/02 | 16/259 |
| 2023/0225065 | A1 * | 7/2023 | Sandnes | H05K 5/0247 | 49/70 |
| 2023/0240033 | A1 * | 7/2023 | Gallo | H05K 5/061 | 312/100 |

OTHER PUBLICATIONS

Apex Industrial Supply—Carrlane Latch-Action Toggle Clamp https://apexindustrialsupply.com/carrlane-latch-action-toggle-clamp-cl-110-pa-s/ (Year: 2024).* https://www.mcmaster.com/products/removable-pin-hinges/pin-type~lift-off/surface-mount-lift-off-hinges-with-holes-9/?s=removable-pin-hinges (Year: 2024).*

* cited by examiner

HINGE PIN KEEPER AND ENCLOSURE WITH AMBIDEXTROUS LIFT OFF-HINGE

CROSS-REFERENCE TO RELATED APPLICATIONS

This application claims priority to U.S. Provisional Patent Application Ser. No. 63/291,959, filed Dec. 21, 2021, and titled HINGE PIN KEEPER AND ENCLOSURE WITH AMBIDEXTROUS LIFT-OFF-HINGE, which is herein incorporated by reference in its entirety.

FIELD OF THE INVENTION

This application is directed to hinges and enclosures.

BACKGROUND OF THE INVENTION

In industry, there is often a need for more retention of hinge pins of enclosure door hinges. Further, there is also sometimes a need to switch the handedness of an enclosure door.

BRIEF SUMMARY OF THE INVENTION

According to one aspect of the present invention, an enclosure with an ambidextrous lift-off hinge has base and a door. The door has a hinge side and a clamp side. The clamp side being located opposite said hinge side. The hinge side of said door has right-handed door hinges and left-handed door hinges. The base has a right base wall and a left base wall, with the right base wall being opposite said left base wall. The right base wall has right-handed base wall hinges positioned to interface through a pivoting liftoff connection with said right-handed door hinges, when said door is mounted in a right-handed position. The base has a left base wall having left-handed base wall hinges positioned to interface through a pivoting liftoff connection with said left-handed door hinges, when said door is mounted in a left-handed position. The liftoff connections permit the handedness of the door mounting to be changed without the use of tools by lifting said door in a first handedness configuration, rotating said door 180 degrees relative to said base, and mounting said door back on said hinges in a second handedness configuration, with said first handedness configuration being the opposite of said second handedness configuration.

In another aspect of the invention, said right-handed base wall hinges comprise a first right-handed base wall hinge and a second right-handed base wall hinge, and said left handed base wall hinges comprise a first left-handed base wall hinge and a second left-handed base wall hinge.

In another aspect of the invention, said right-handed door hinges comprise a first right-handed door hinge and a second right-handed door hinge; and said left-handed door hinges comprise a first left-handed door hinge and a second left-handed door hinge.

In another aspect of the invention, said clamp side of said door has a clamp side clamp that interfaces with a left base wall lug of said left base wall, when said door is in a right-handed hinged configuration, and said clamp side clamp interfaces with a right base wall lug of said right base wall, when said door is in a left-handed hinged configuration.

In another aspect of the invention, said door has a first side with a first side clamp that interfaces with a top base wall lug of a top base wall of said base, when said door is in a left-handed hinged configuration, and said first side clamp interfaces with a bottom base wall lug of a bottom base wall of said base, when said door is in a right-handed hinged configuration.

In another aspect of the invention, said door has a second side located opposite a first side of said door, said second side has a second side clamp that interfaces with a bottom base wall lug of a base wall of said base, when said door is in a left-handed hinged configuration, and said second side clamp interfaces with a top base wall lug of a top base wall of said base, when said door is in a right-handed hinged configuration.

According to one aspect of the present invention, a hinge pin keeper includes a shaft having a first end and a second end, with said first end being opposite of said second end. The first end of said shaft having a hook, said hook having a first end connected to said first end of said shaft and a second end having a tang that returns downward toward said second end of said shaft. The second end of said shaft of said keeper having a coil configured to positively capture a tip of a hinge pin, said coil having a first straight section and a helical portion, said first straight section is located between said helical portion and said second end of said shaft of said keeper. The hook is captured in an eye of a hinge pin of a hinge assembly, when said tang is placed through said eye of said hinge pin and said keeper is rotated to about said shaft of said keeper with a shaft of said hinge pin. The coil is configured to be placed onto and capture said tip of said hinge pin, when said shaft of said keeper is about parallel to said shaft of said hinge pin and deflected.

In another aspect of the invention, said coil has at least about 1.5 turns.

In another aspect of the invention, said coil forms an angle of about 100 degrees with respect to said shaft of said keeper.

In another aspect of the invention, said first straight section of said coil forms an obtuse angle with said first straight section of said hook when looking down said shaft of said keeper. The obtuse angle is about 107.3 degrees.

In another aspect of the invention, said hook forms an obtuse angle with respect to said shaft of said keeper. The obtuse angle is about 99 degrees.

In another aspect of the invention, a distance from a top of said hook to an end of said tank is about 0.120 inches.

In another aspect of the invention, a length of said shaft of said hinge pin is about 2.710 inches.

In another aspect of the invention, said hinge pin keeper is comprised of a stainless steel wire having a diameter of about 0.040 inches.

In another aspect of the invention, said hook has an inner curved radius portion of about 0.080 inches.

Advantages of the present invention will become more apparent to those skilled in the art from the following description of the embodiments of the invention which have been shown and described by way of illustration. As will be realized, the invention is capable of other and different embodiments, and its details are capable of modification in various respects.

BRIEF DESCRIPTION OF SEVERAL VIEWS OF THE DRAWINGS

These and other features of the present invention, and their advantages, are illustrated specifically in embodiments of the invention now to be described, by way of example, with reference to the accompanying diagrammatic drawings, in which:

FIGS. 28-34 are views of a base of an enclosure with an ambidextrous lift-off hinge in accordance with an exemplary embodiment of the invention.

The same reference numbers are generally used to refer to corresponding or similar features in the different embodiments. Accordingly, the drawing(s) and description are to be regarded as illustrative in nature and not as restrictive.

DETAILED DESCRIPTION OF THE PREFERRED EMBODIMENT

Figure 1:
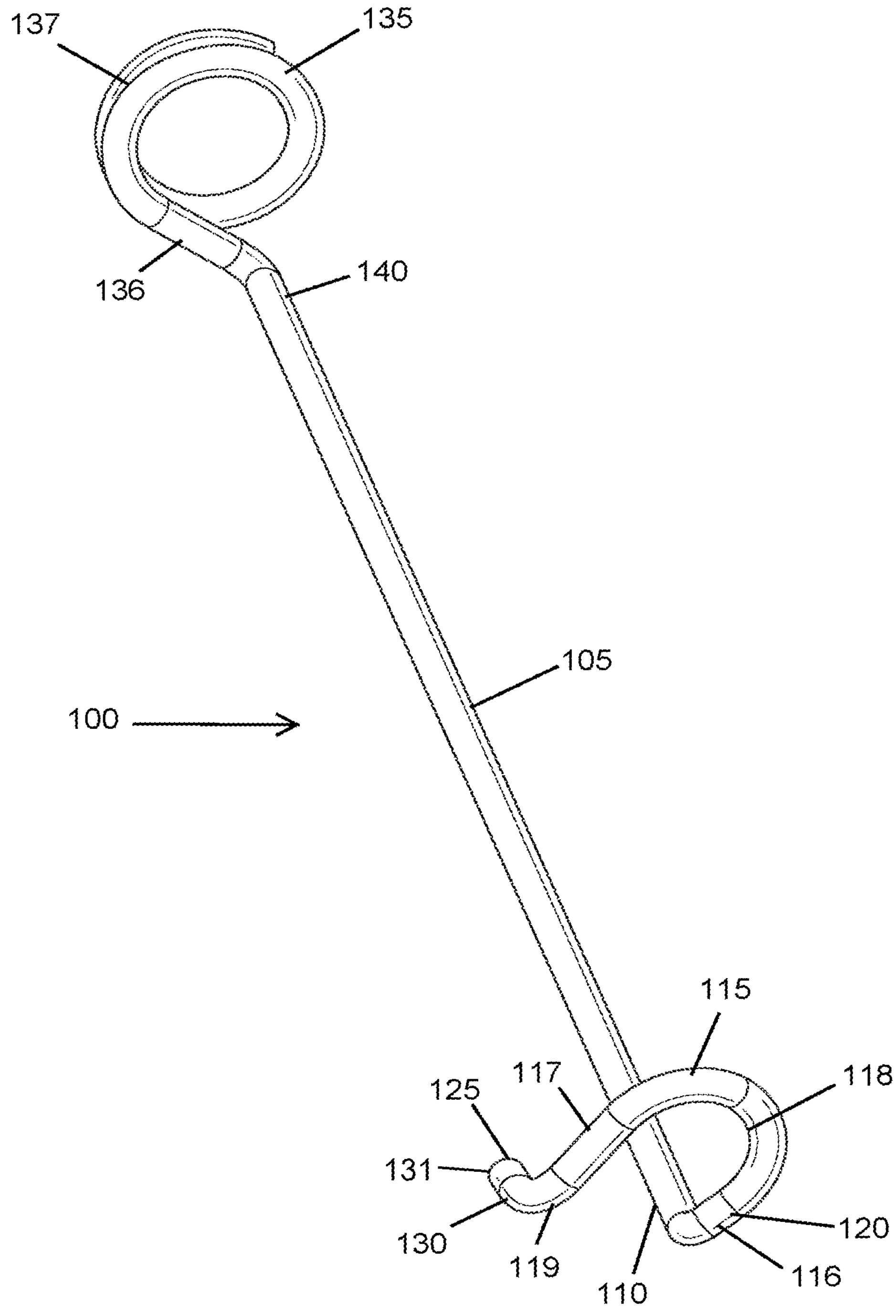
FIG. 1 is an isometric view of hinge pin keeper in accordance with an exemplary embodiment of the invention.
Figure 2:
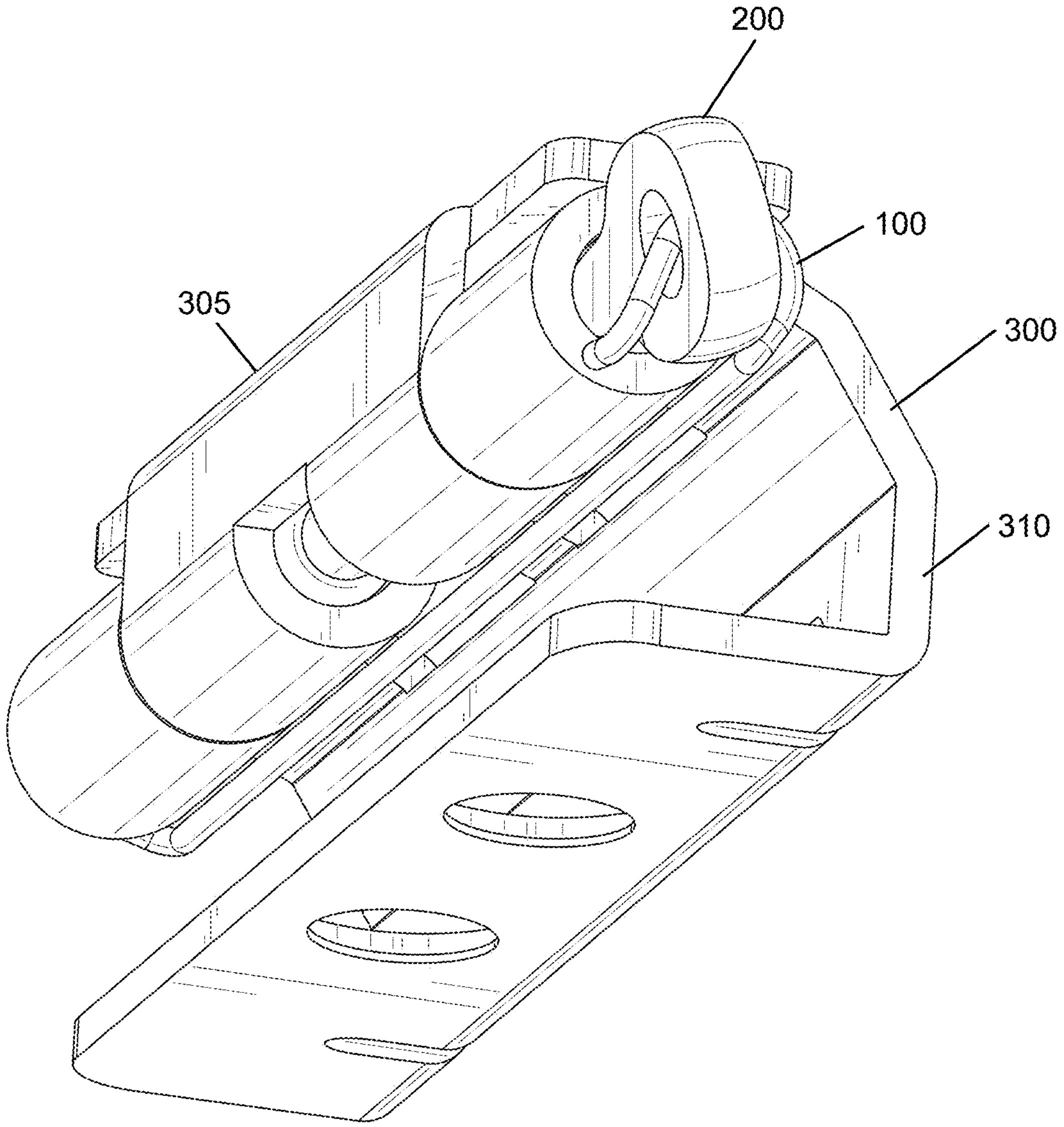
FIG. 2 is an exploded view of the is an isometric view of hinge pin keeper installed in a hinge pin of a hinge in accordance with an exemplary embodiment of the invention.
Figure 3:
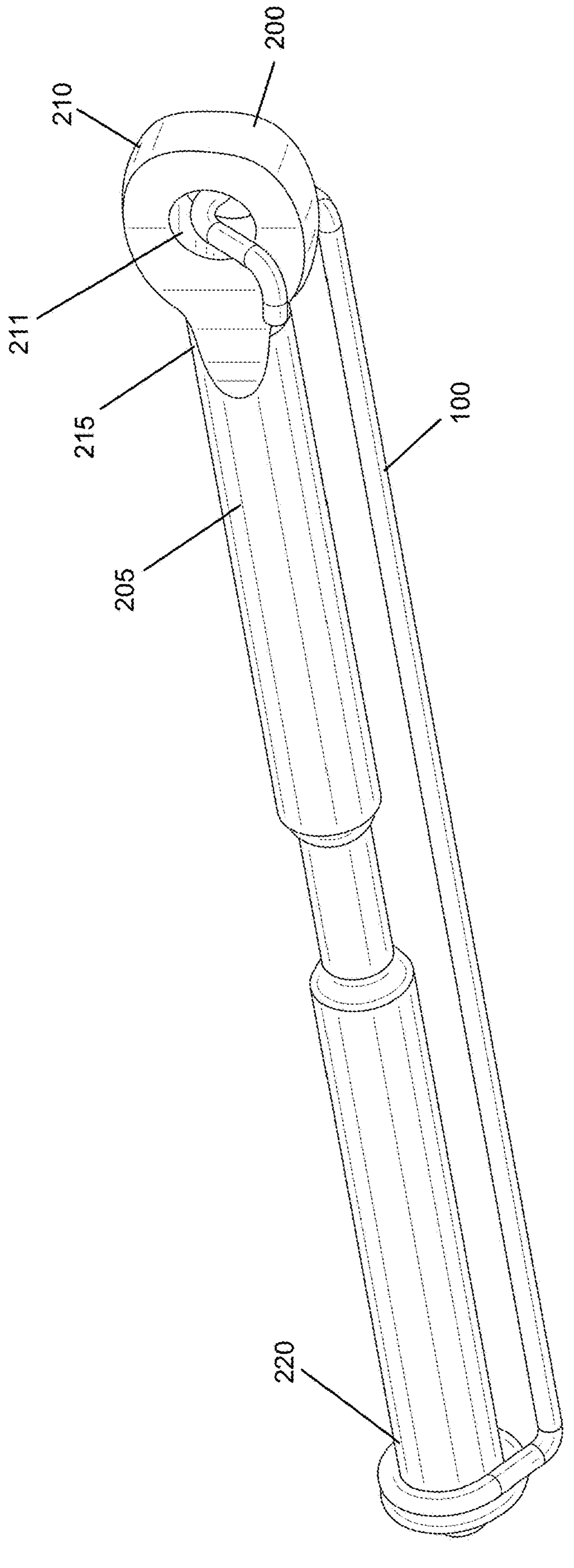
FIG. 3 is an isometric view of hinge pin keeper in a hinge pin in accordance with an exemplary embodiment of the invention.
Figure 4:
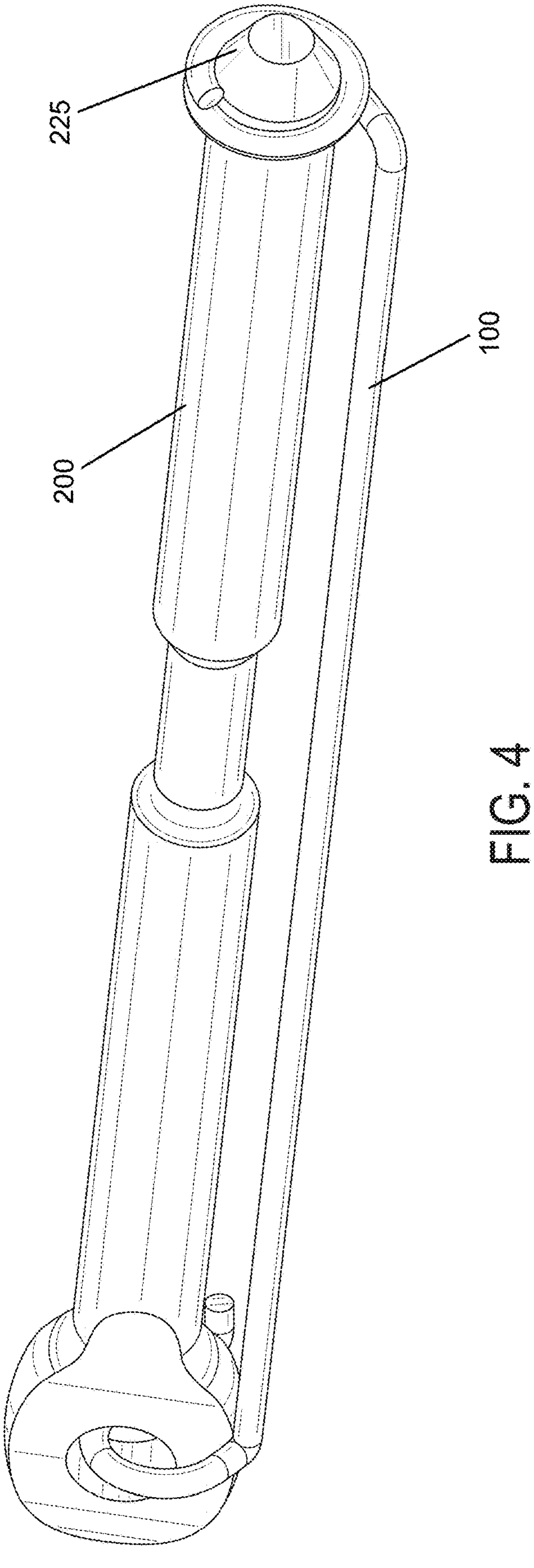
FIG. 4 is an isometric view of hinge pin keeper in a hinge pin in accordance with an exemplary embodiment of the invention.
Figure 5:
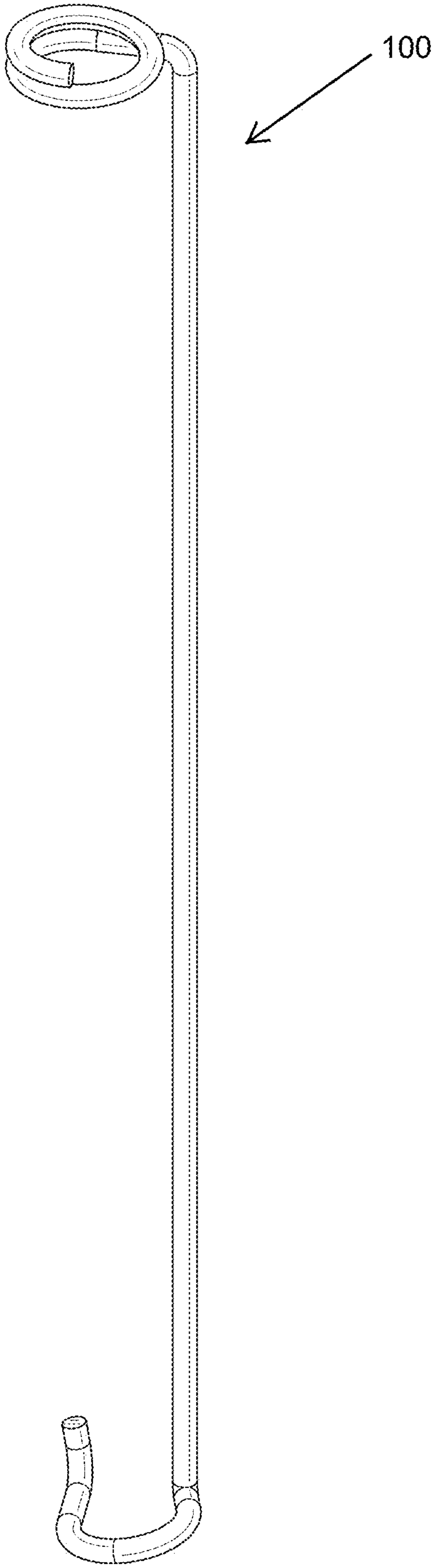
FIG. 5 is a isometric view of a hinge pin keeper in accordance with an exemplary embodiment of the invention.
Figure 6:
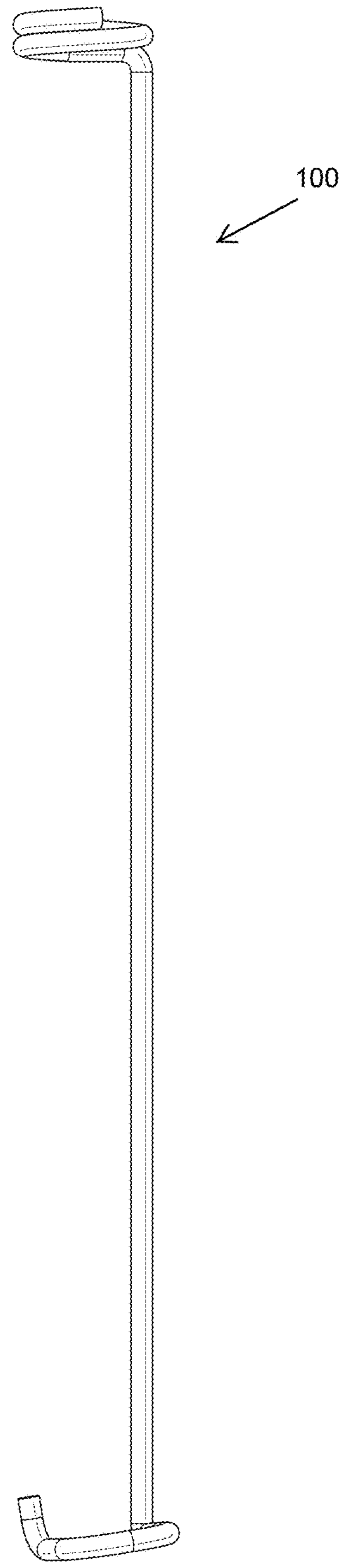
FIG. 6 is right side view of a hinge pin keeper in accordance with an exemplary embodiment of the invention.
Figure 7:
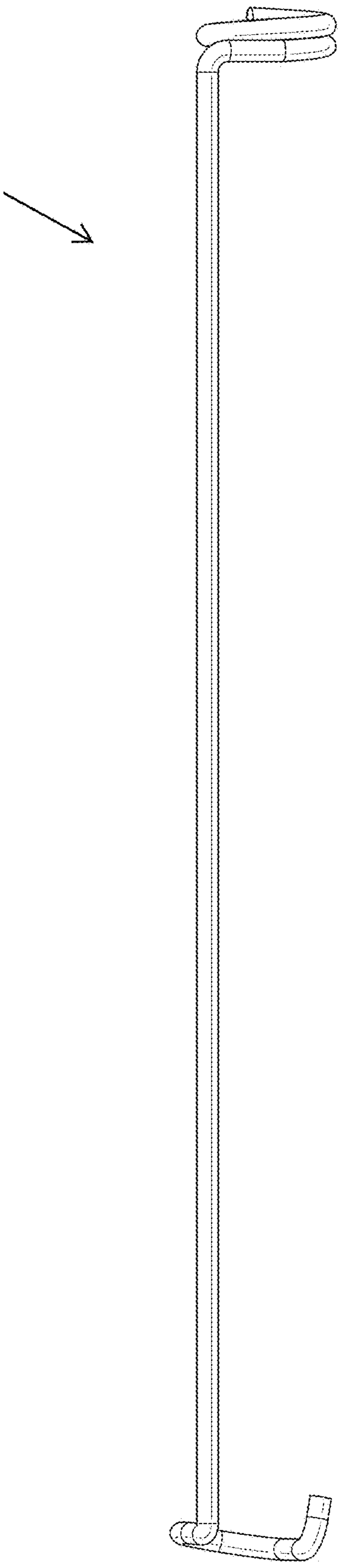
FIG. 7 is a left side view of a hinge pin keeper in accordance with an exemplary embodiment of the invention.
Figure 8:
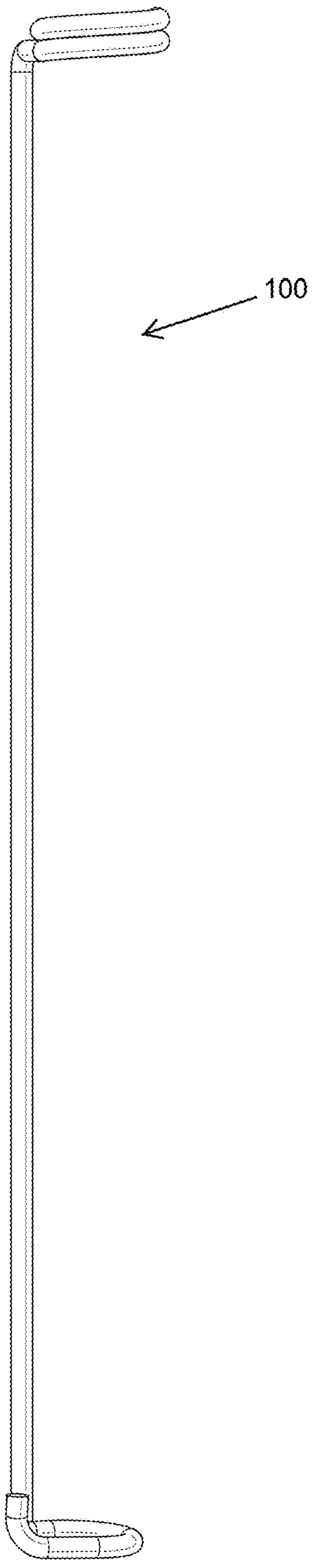
FIG. 8 is a front side view of a hinge pin keeper in accordance with an exemplary embodiment of the invention.
Figure 9:
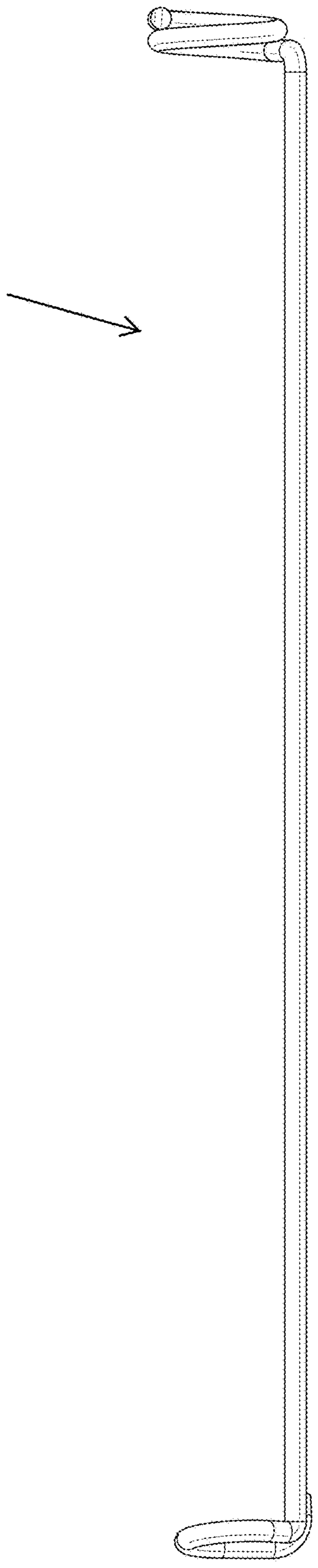
FIG. 9 is a rear side view of a hinge pin keeper in accordance with an exemplary embodiment of the invention.
Figure 10:
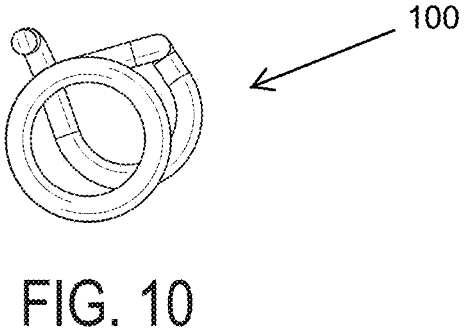
FIG. 10 is a top view of a hinge pin keeper in accordance with an exemplary embodiment of the invention.
Figure 11:
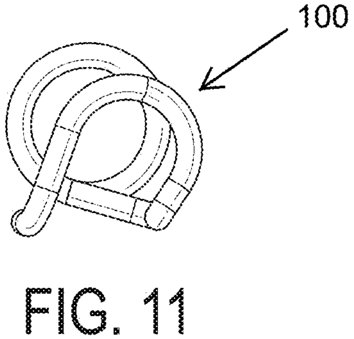
FIG. 11 is a bottom view of a hinge pin keeper in accordance with an exemplary embodiment of the invention.

Approximating language, as used herein throughout the specification and claims, may be applied to modify any quantitative representation that could permissibly vary without resulting in a change in the basic function to which it is related. Accordingly, a value modified by a term or terms, such as "about", is not limited to the precise value specified. In at least some instances, the approximating language may correspond to the precision of an instrument for measuring the value. Range limitations may be combined and/or interchanged, and such ranges are identified and include all the sub-ranges stated herein unless context or language indicates otherwise. Other than in the operating examples or where otherwise indicated, all numbers or expressions referring to quantities of ingredients, reaction conditions and the like, used in the specification and the claims, are to be understood as modified in all instances by the term "about".

"Optional" or "optionally" means that the subsequently described event or circumstance may or may not occur, or that the subsequently identified material may or may not be present, and that the description includes instances where the event or circumstance occurs or where the material is present, and instances where the event or circumstance does not occur or the material is not present.

As used herein, the terms "comprises", "comprising", "includes", "including", "has", "having", or any other variation thereof, are intended to cover a non-exclusive inclusion. For example, a process, method, article or apparatus that comprises a list of elements is not necessarily limited to only those elements, but may include other elements not expressly listed or inherent to such process, method, article, or apparatus.

The singular forms "a", "an", and "the" include plural referents unless the context clearly dictates otherwise.

In addition, the language used in the specification has been principally selected for readability and instructional purposes, and may not have been selected to delineate or circumscribe the inventive subject matter. Accordingly, the disclosure of the embodiments is intended to be illustrative, but not limiting, of the scope of the embodiments, which is set forth in the claims.

Turning to FIGS. 1-11, a hinge pin keeper 100 is designed to maintain a hinge pin 200 positioned within a hinge 300.

Historically, hinge pins 200 have had the potential to release inadvertently under certain conditions. The keeper 100 is a positive retention device that prevents this from happening, while also being easy to install and remove from a hinge pin 200 without the use of tools, thereby keeping the functionality of a quick-release hinge intact. The keeper 100 is a non-integral discrete part separate from the hinge pin 200, which is unlike other items that have previously been tried to secure hinge pins in place, such as retaining rings, clevis pins, and cotter pins, which often require tools to install and remove, take more time to install and remove due to their small size and requirement for tools, are easily lost due to their small size, require additional holes to be drilled in the hinge pin 200, and are therefore have many drawbacks when compared to the keeper 100.

The keeper 100 works as intended and is easy for a user to both handle and operate without tools. Further, testing has proven that the keeper 100 cannot separate from the hinge 300 without manual intervention and the hinge pin 200 cannot free itself from the hinge assembly under any conditions that had previously led to failures of previous devices. Further, the keeper 100 provides positive retention that eliminates the possibility of inadvertent release of the hinge pin 200 under normal conditions.

The hinge pin 200 has a shaft 205 with a head 210 on a first end 215 opposite a distal second end 220. The head 210 has an eye 211. The second end 220 has a tip 225.

In an embodiment, keeper 100 is made of a single piece of stainless-steel spring wire formed with two specific features, one being on opposite ends of shaft 105. A first end 110 of the shaft 105 has a hook 115. The hook 115 has a first end 120 attached to the first end 110 of the shaft 105, and a second end 125 having a tang 130 that returns downward toward the second end 140 of the shaft 105.

In some embodiments, the hook 115 forms an obtuse angle with respect to the shaft 105. In one embodiment, the obtuse angle formed by the hook 115 with respect to the shaft 105 is about 99 degrees. Further, in some embodiments, a distance from a top 119 of the hook 115 to an end 131 of the tang 130 is about 0.120 inches. Additionally, in some embodiments, a length of the shaft 105 can be about 2.710 inches and a diameter of the wire of the keeper 100 can be about 0.040 inches through all the keeper 100. Further, an inner curved radius portion 118 of the hook 115 can be about 0.080 inches with a first straight section 116 of the hook 115 being situated between the shaft 105 and the inner curved radius portion 118, and a second straight section 117 of the hook 115 being situated between the inner curved radius portion 118 and the tang 130. In some embodiments, the first straight section 116 can be about 0.040 inches long and the second straight section 117 can be about 0.100 inches long.

In operation, the tang 130 of the hook 115 is placed through the eye 211 of the hinge pin 200 and the keeper 100 is rotated such that the shaft 105 of the keeper runs roughly parallel to the shaft 205 of the hinge pin 200, which effectively captures the hook 115 of the keeper 100 in the eye 211 of the hinge pin 200.

The second end 140 of the shaft 105 of the keeper 100 has a coil 135 that acts to positively capture the tip 225 of the hinge pin 200, when keeper 100 is installed on the hinge pin 200. The coil 135 has a first straight section 136 and a helical portion 137. The first straight section 136 is present between the second end 140 of the shaft 105 and the helical portion 137 of the coil 135.

In some embodiment, the first straight section 136 of the coil 135 forms an obtuse angle with the first straight section 116 of the hook 115, when looking down the shaft 105 of the keeper 100. In an embodiment, the angle formed by the first straight section 136 of the coil 135 and the first straight section 116 of the hook 115 is about 107.3 degrees. Further, in some embodiments, the coil 135 forms about a ninety degree angle with the shaft 105, the radius of the coil 135 is about 0.105 inches, the inner diameter of the coil 135 is about 0.200 inches, and the coil 135 contains about 1.5 revolutions of wire. In other embodiments, the coil 135 contains at least 1.5 revolutions of wire.

In operation to install the keeper 100 on the hinge pin 200, the keeper 100, hinge pin 200, and hinge 300 are provided. The first part 305 and second part 310 of the hinge are assembled. The hinge pin 200 is then inserted into the assembled hinge 300. Next, the tang 130 of the hook 115 is placed through the eye 211 of the hinge pin 200 and the keeper 100 is rotated such that the shaft 105 of the keeper runs roughly parallel to the shaft 205 of the hinge pin 200, which effectively captures the hook 115 of the keeper 100 in the eye 211 of the hinge pin 200. Next, a bending force is applied to the keeper 100 to deflect the shaft 105 such that the coil 135 is angled to fit over the tip 225 of the hinge pin 200, and the coil 135 is positioned over the tip 225. Next, the force is removed, thereby permitting the coil 135 to descend down and surround the tip 225 of the hinge pin 200. Thereby, the keeper 100 is installed on the hinge pin 200, the hook 115 effectively captures the head 210 of the hinge pin 200 and the coil 135 effectively captures the tip 225 of the hinge pin 200. The bending force can be applied with the fingers, therefore permitting the keeper 100 to be installed on the hinge pin 200 without the use of tools.

The removal of the keeper 100 on the hinge pin 200 is the opposite of installation with applying a bending force to the keeper 100 to deflect the shaft 105 such that the coil 135 is lifted up from surrounding the tip 225 of the hinge pin 200. The coil 135 is then moved away from the tip 225 of the hinge pin, such that the coil 135 is no longer above the tip 225 and will not surround the tip 225 when the deflection is removed from the shaft 105. The force is then removed from the keeper 100 thereby removing the deflection from the shaft 105. The keeper 100 shaft 105 is then brought into a non-parallel position with the hinge pin shaft 205, and the keeper 100 is manipulated to remove the hook 115 from the eye 211. Thereby, the hinge pin 200 is no longer captured by the keeper 100. The hinge pin 200 is then removed from the hinge 300, and the first part 305 is then disassembled from the second part 310 of the hinge 300.

When a hinge pin 200 is secured within the hinge 300 by the keeper 100, a first part 305 and a second part 310 of the hinge 300 are rotatable about the hinge pin 200, without risking the hinge pin 200 becoming displaced, thereby potentially leading to a degradation of performance or malfunction of the hinge 300, such as, but not limited to, the hinge 300 being difficult to rotate, jamming, and/or separating.

The keeper 100 was designed to require a lift off force of no less than 4 lb but no greater than 10 lb of tensile force at the required deflection of 0.150" to clear the tip 225 of the hinge pin 200. This was determined to be the range that most prevented inadvertent disengagement while maintaining ease of operation without tools. Once the form of the keeper 100 was determined, this range was achieved through wire composition and diameter selection with the added condition of ensuring that plastic deformation (failure to return to original form) would not occur under any expected condition of use.

Figure 12:
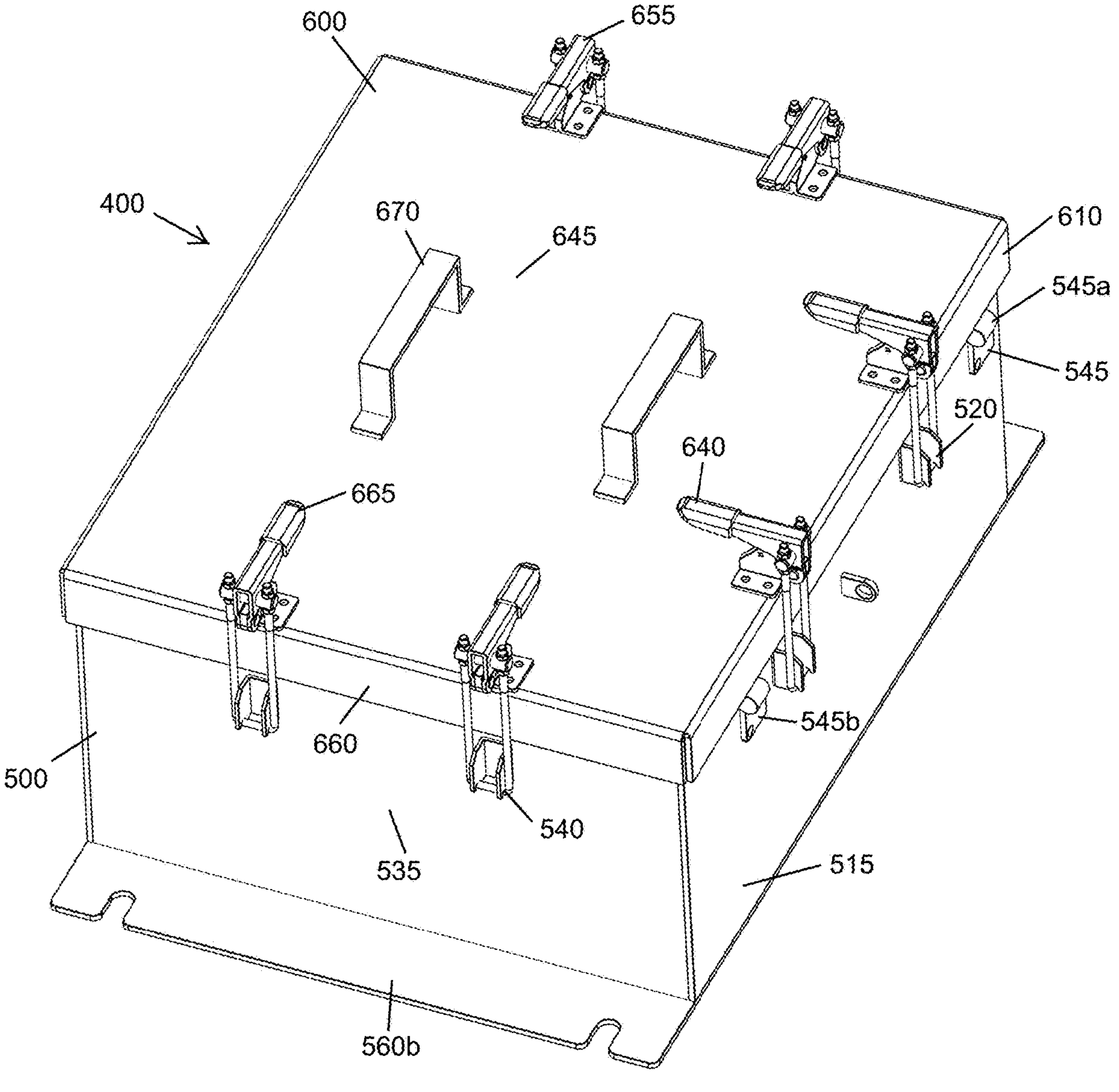
FIG. 12 is an isometric view of an enclosure with an ambidextrous lift-off hinge in accordance with an exemplary embodiment of the invention.
Figure 13:
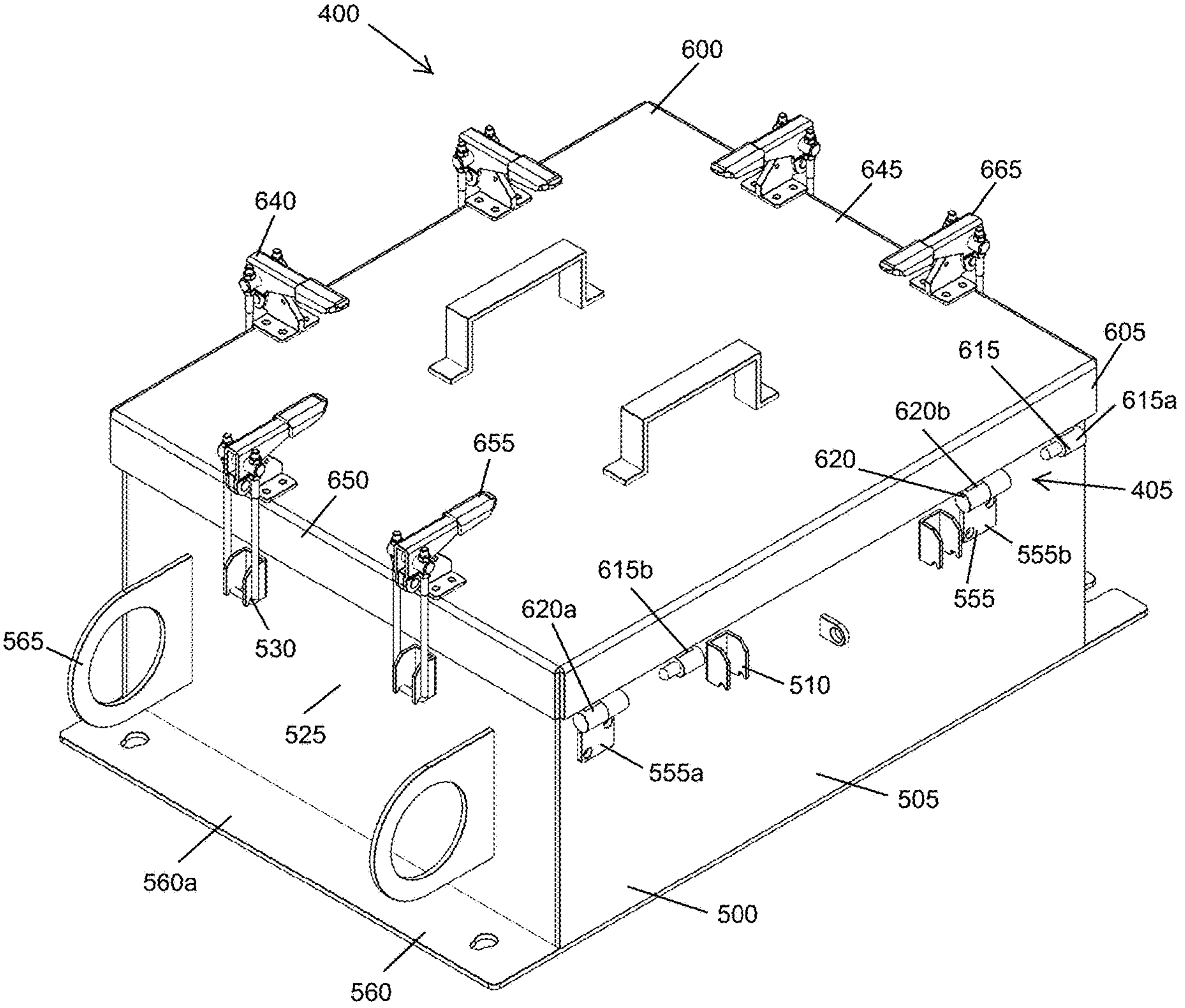
FIG. 13 is an isometric view of an enclosure with an ambidextrous lift-off hinge in accordance with an exemplary embodiment of the invention.
Figure 14:
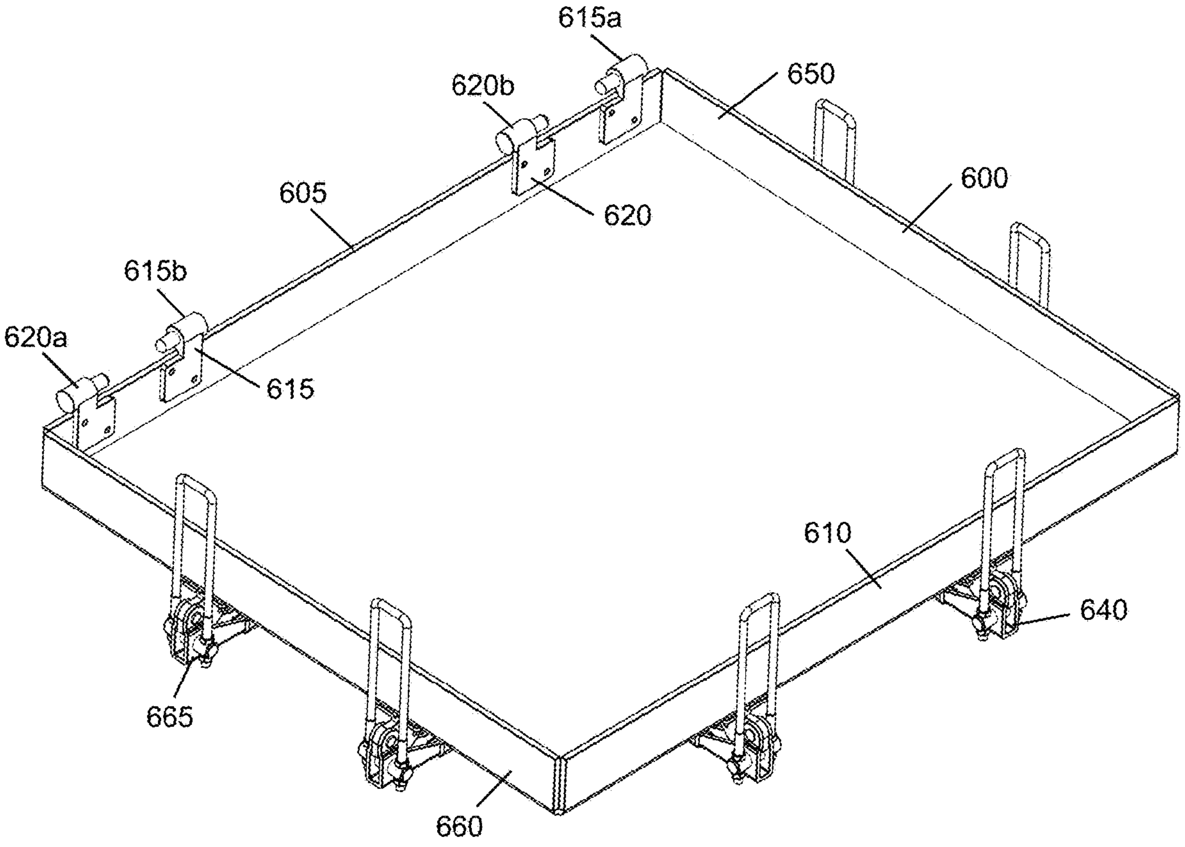
FIG. 14 is an isometric view of a door for an enclosure with an ambidextrous lift-off hinge in accordance with an exemplary embodiment of the invention.
Figure 15:
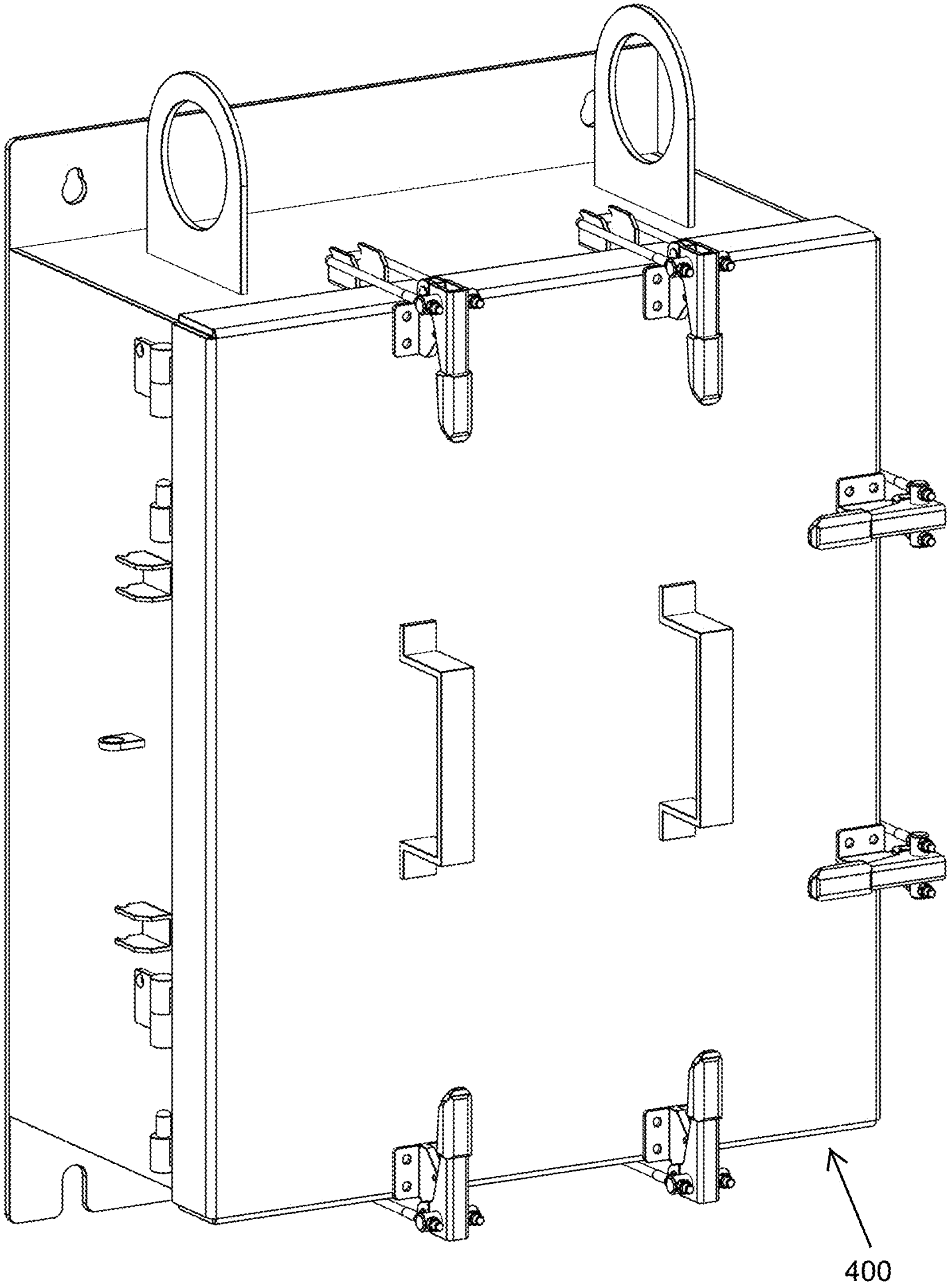
FIGS. 15-21 are views of an enclosure with an ambidextrous lift-off hinge in accordance with an exemplary embodiment of the invention.
Figure 16:
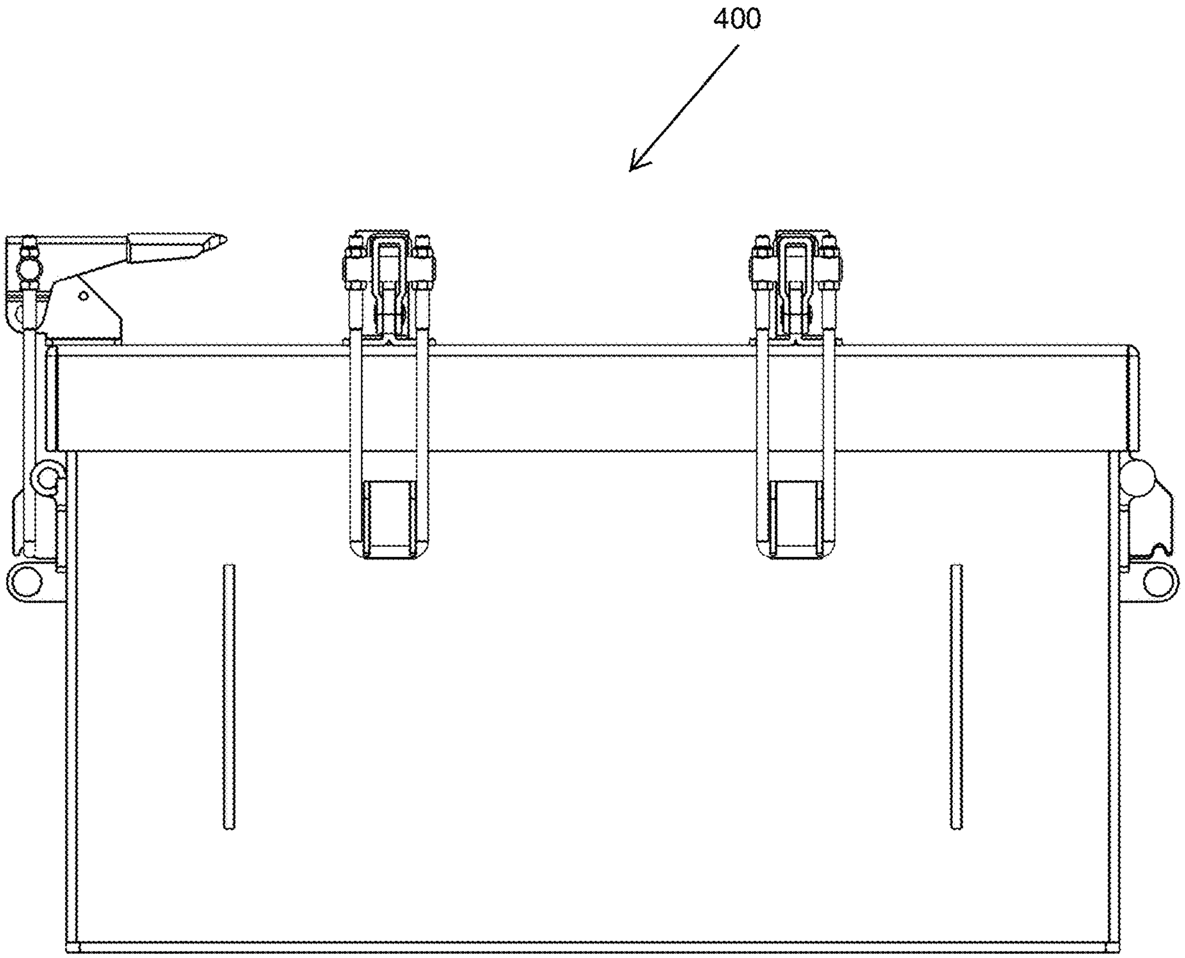
Figure 17:
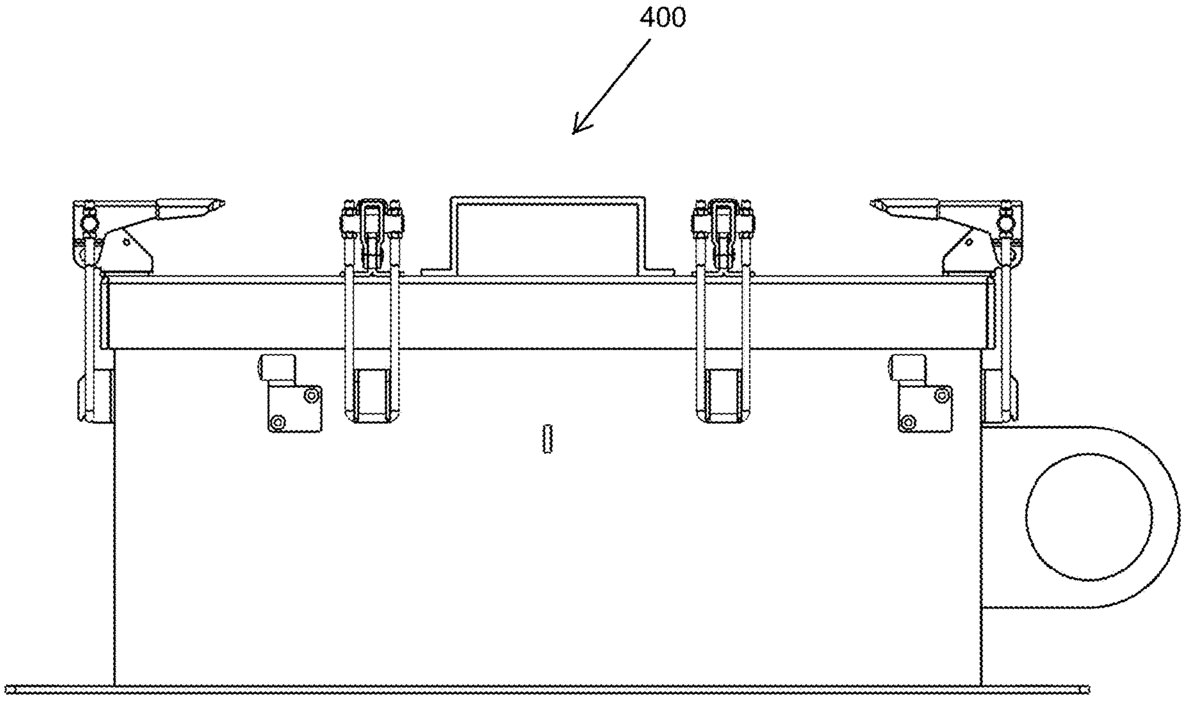
Figure 18:
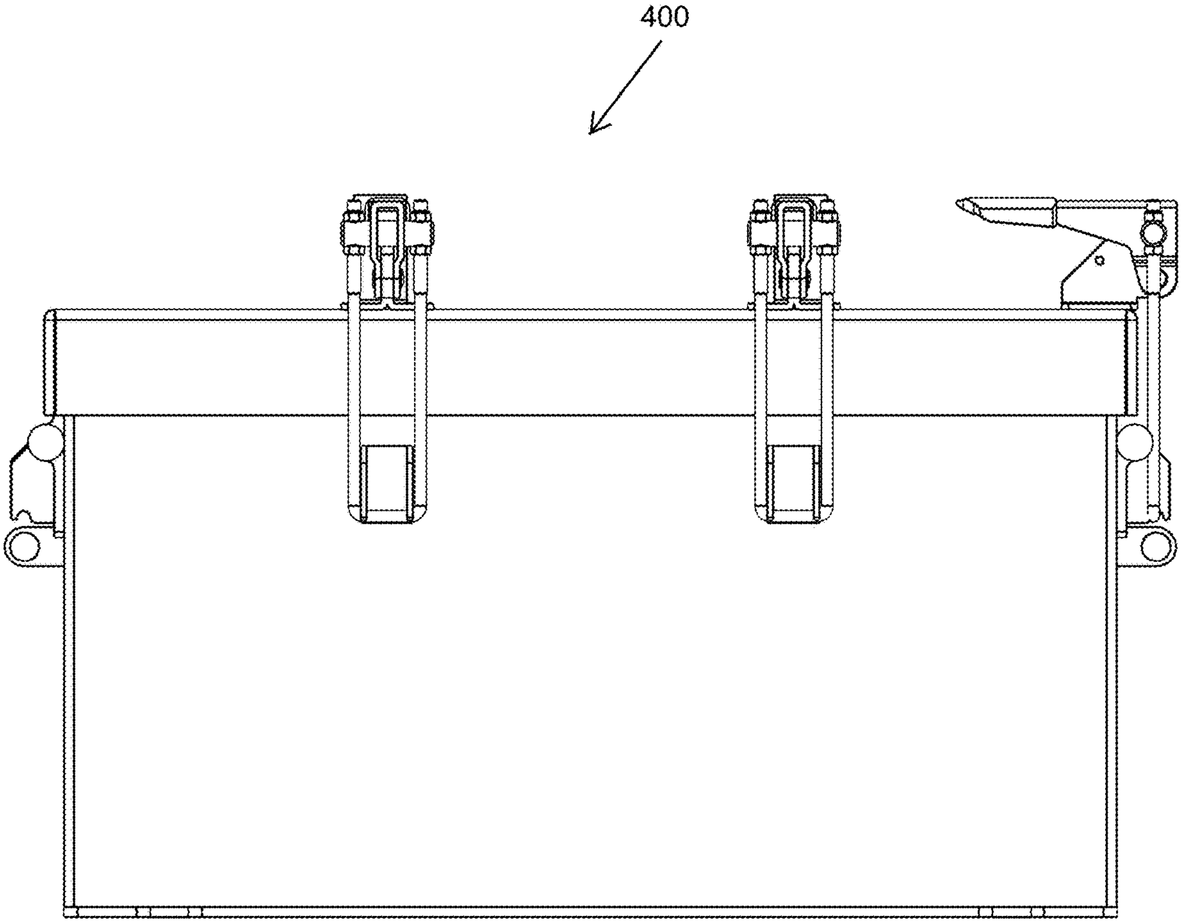
Figure 19:
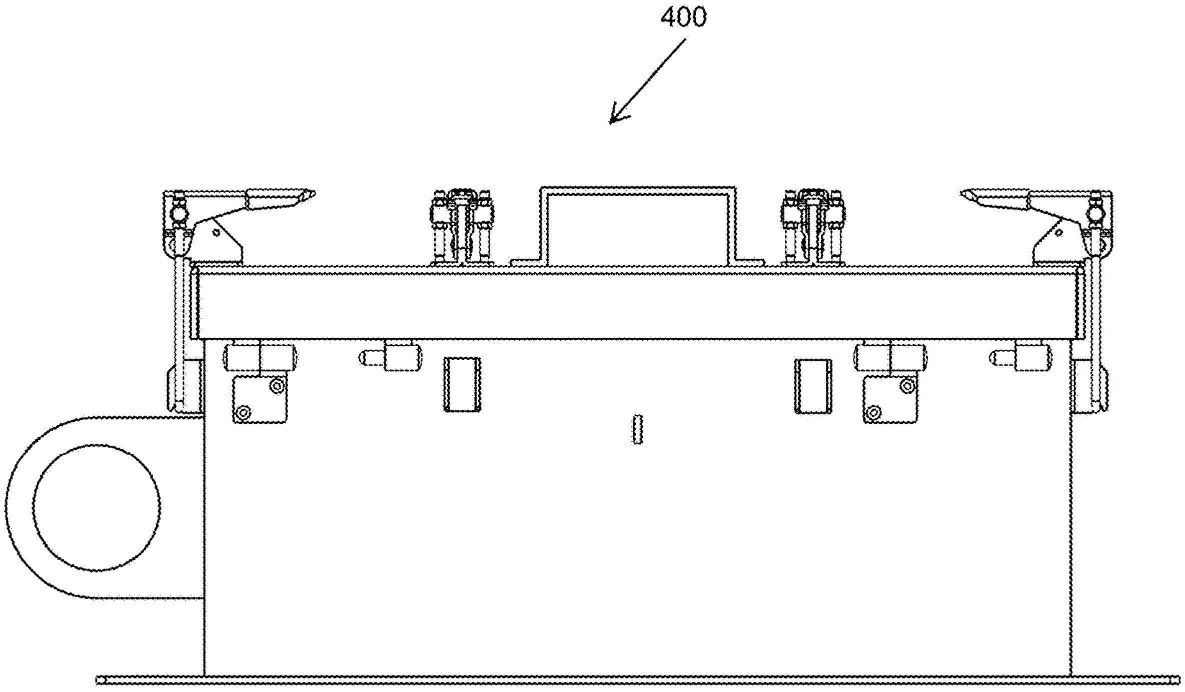
Figure 20:
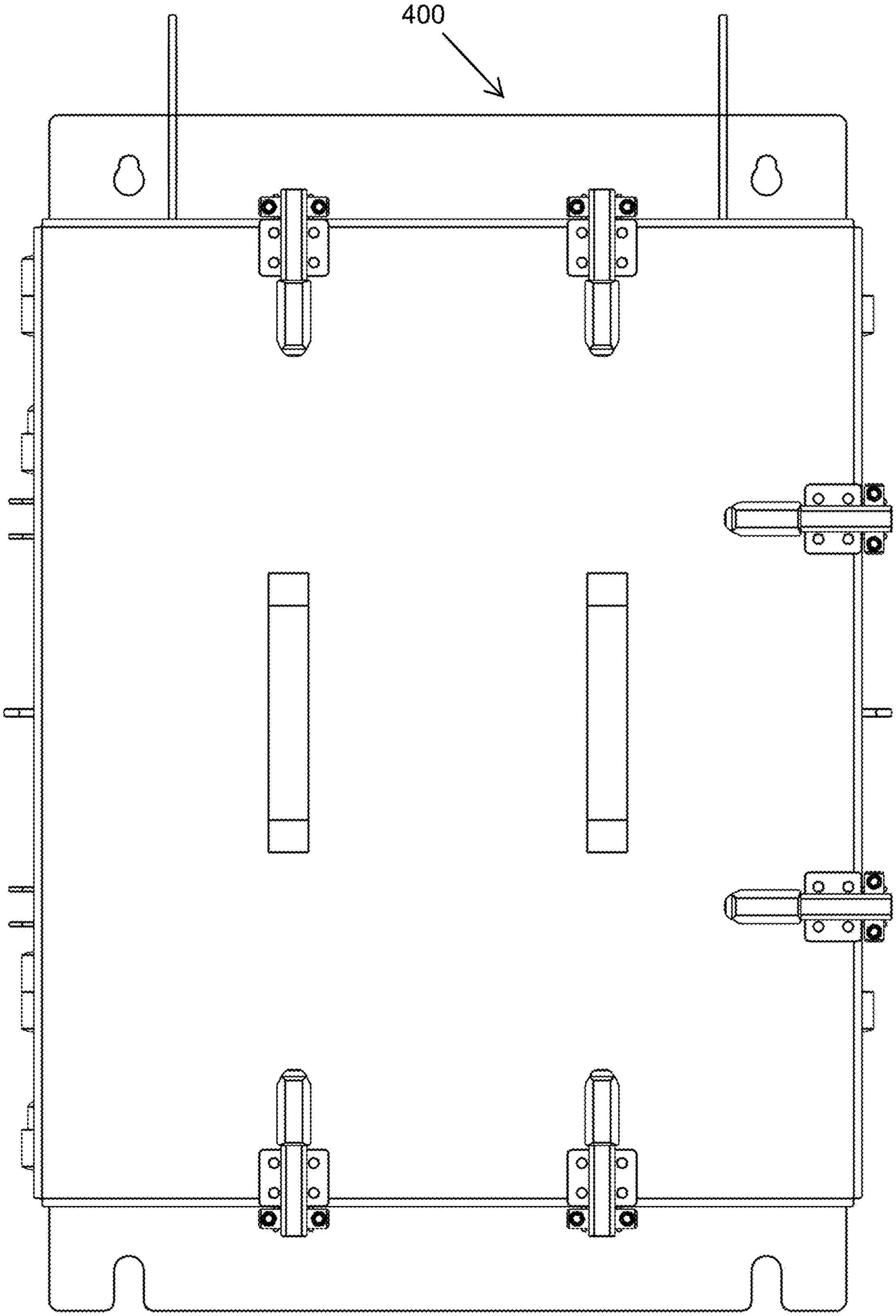
Figure 21:
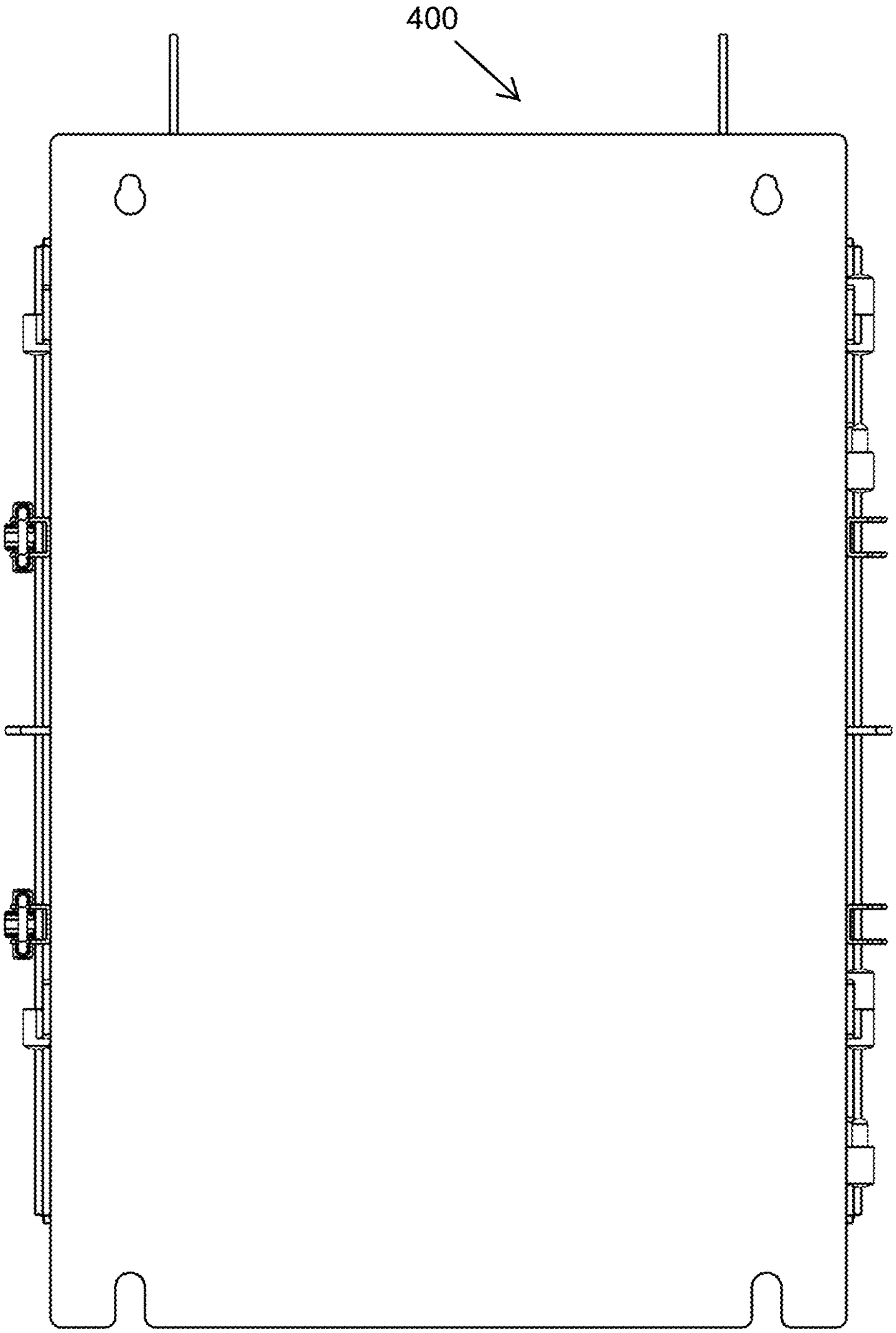
Figure 22:
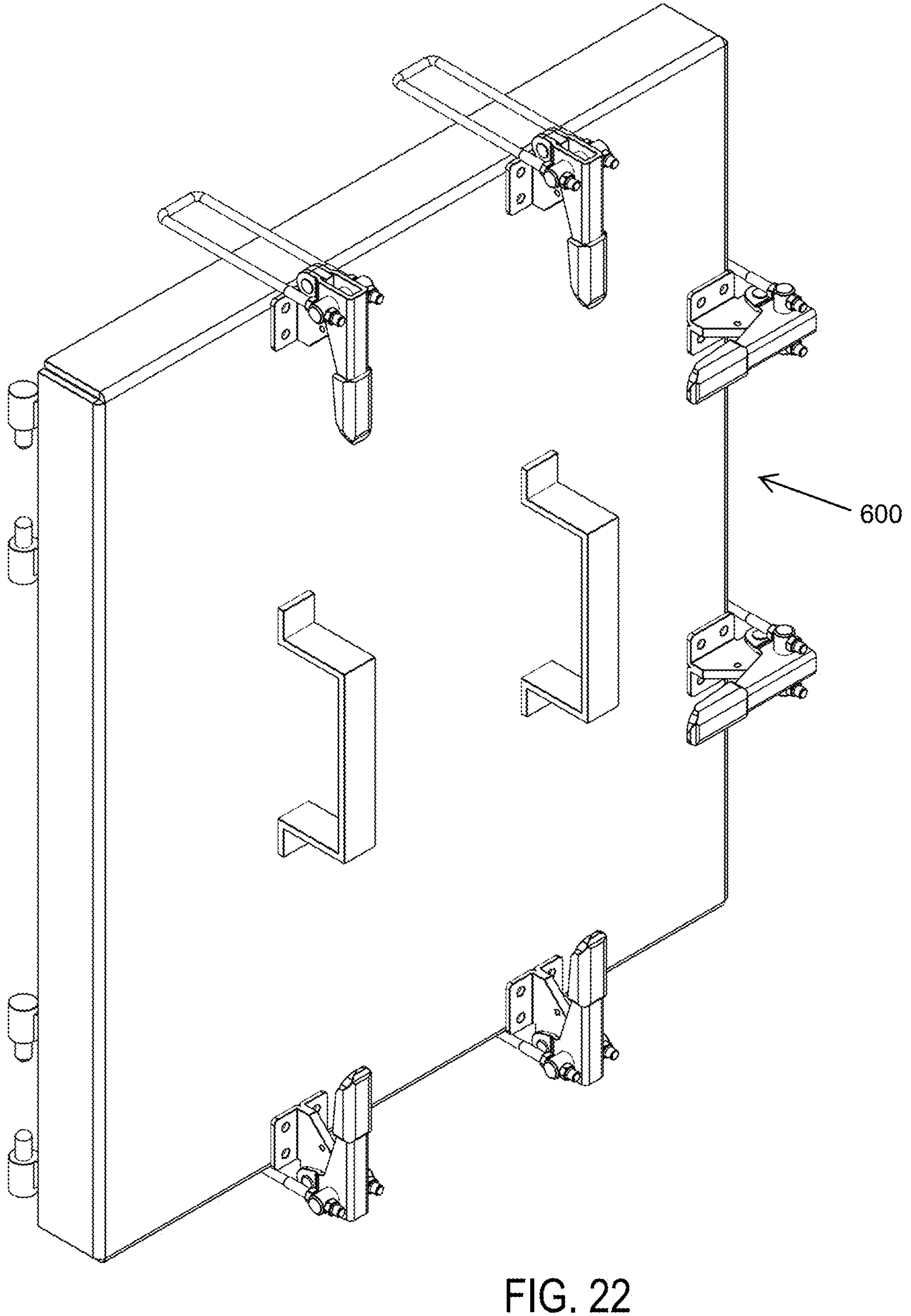
FIGS. 22-28 are views of a door of an enclosure with an ambidextrous lift-off hinge in accordance with an exemplary embodiment of the invention.
Figure 23:
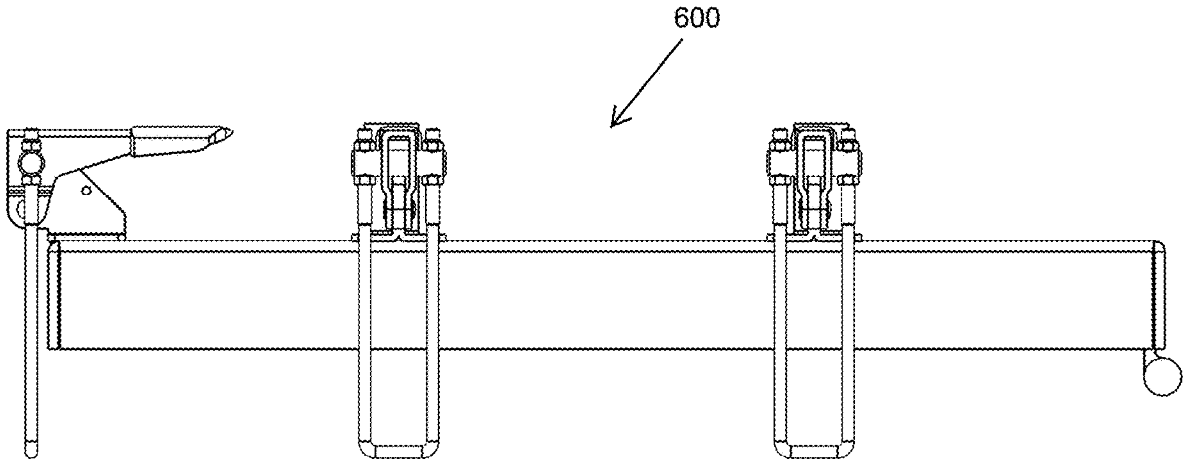
Figure 24:
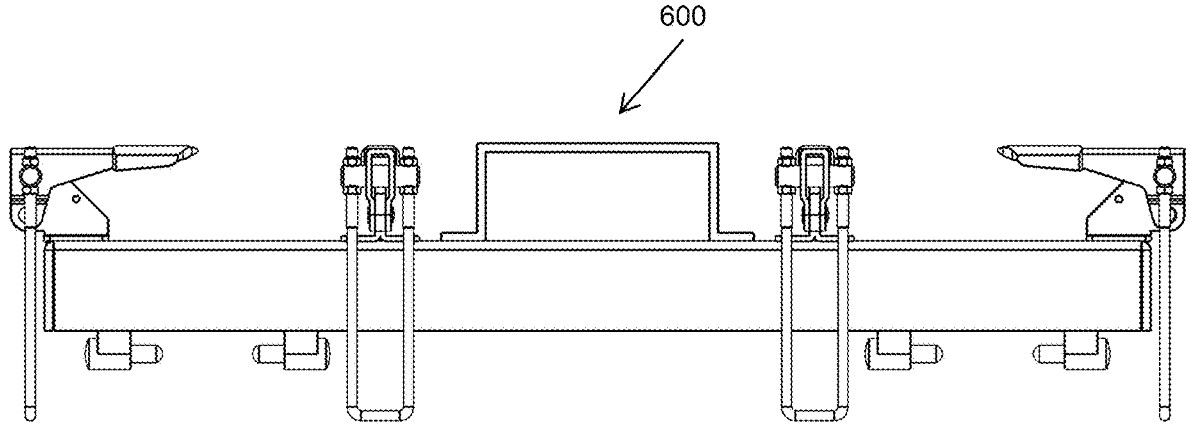
Figure 25:
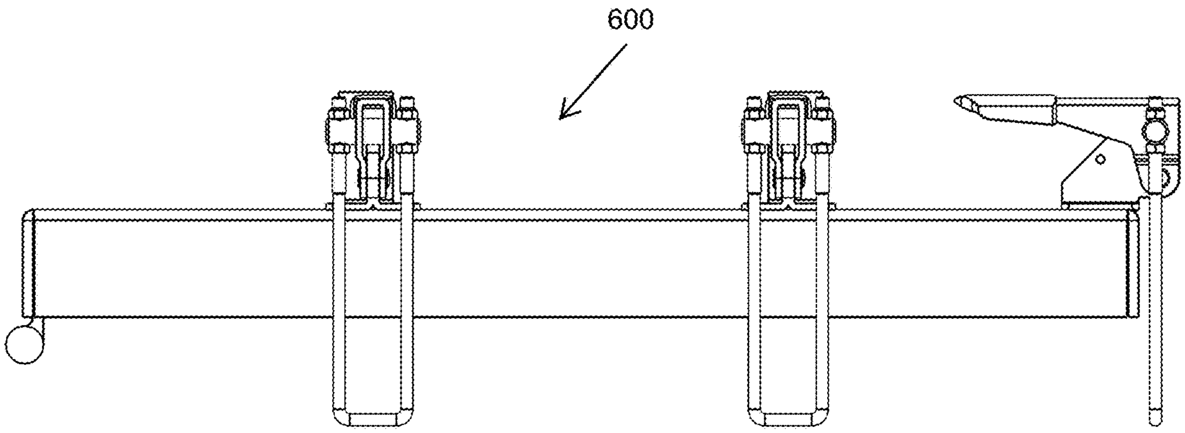
Figure 26:
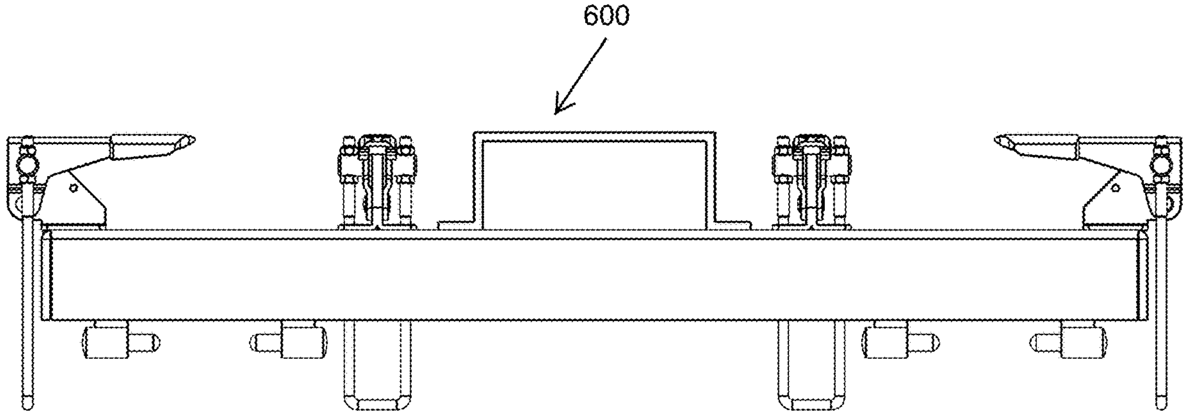
Figure 27:
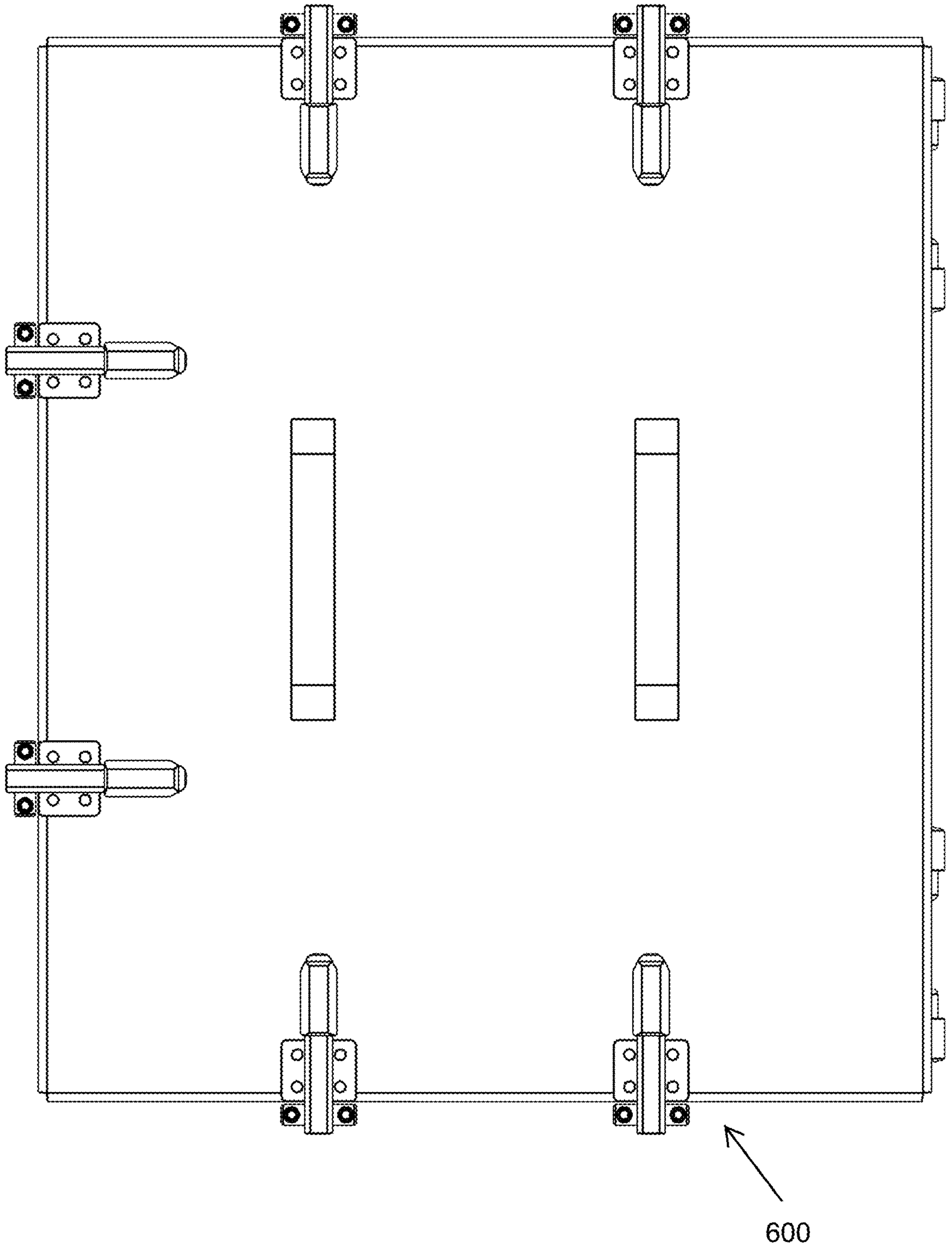
Figure 28:
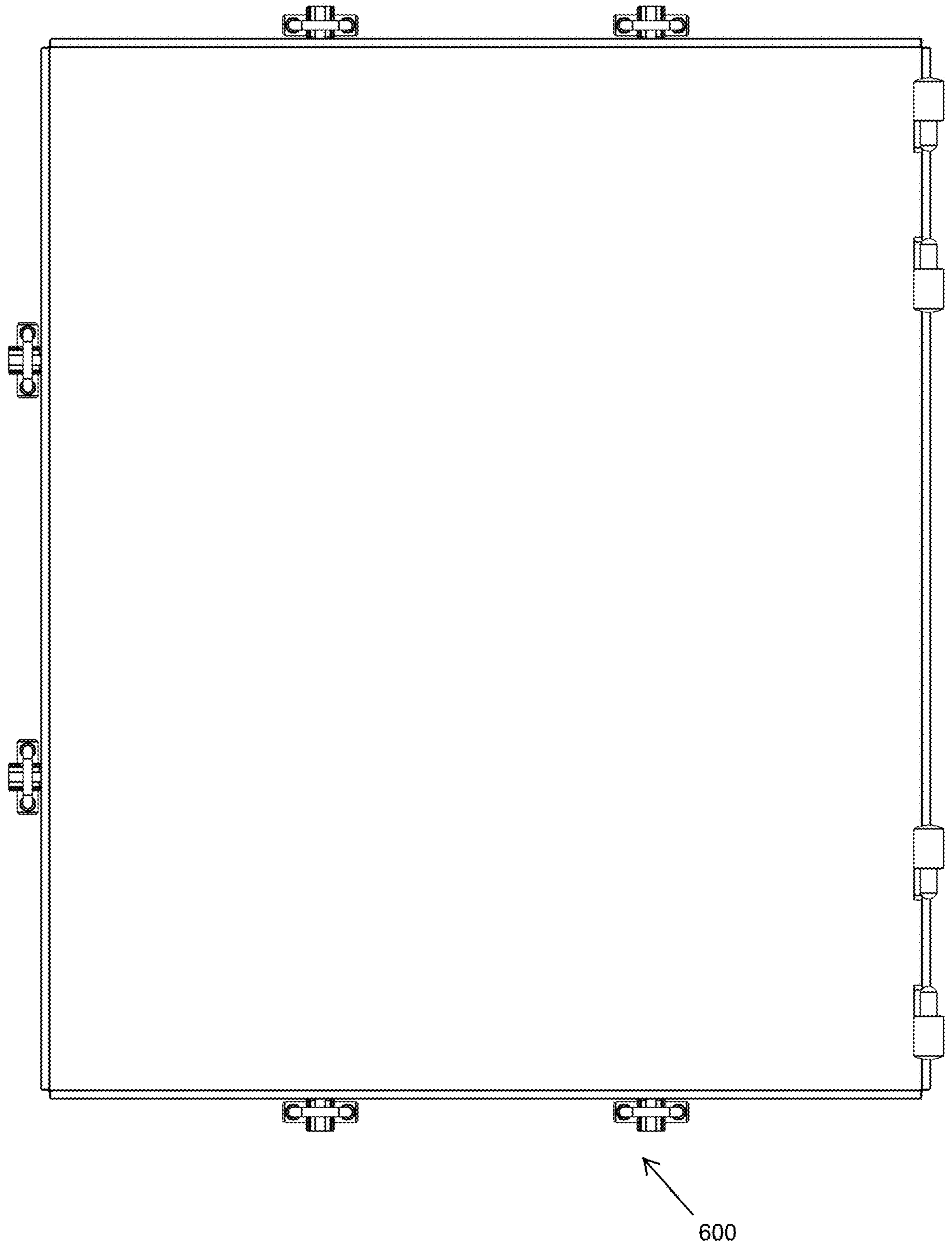
Figure 29:
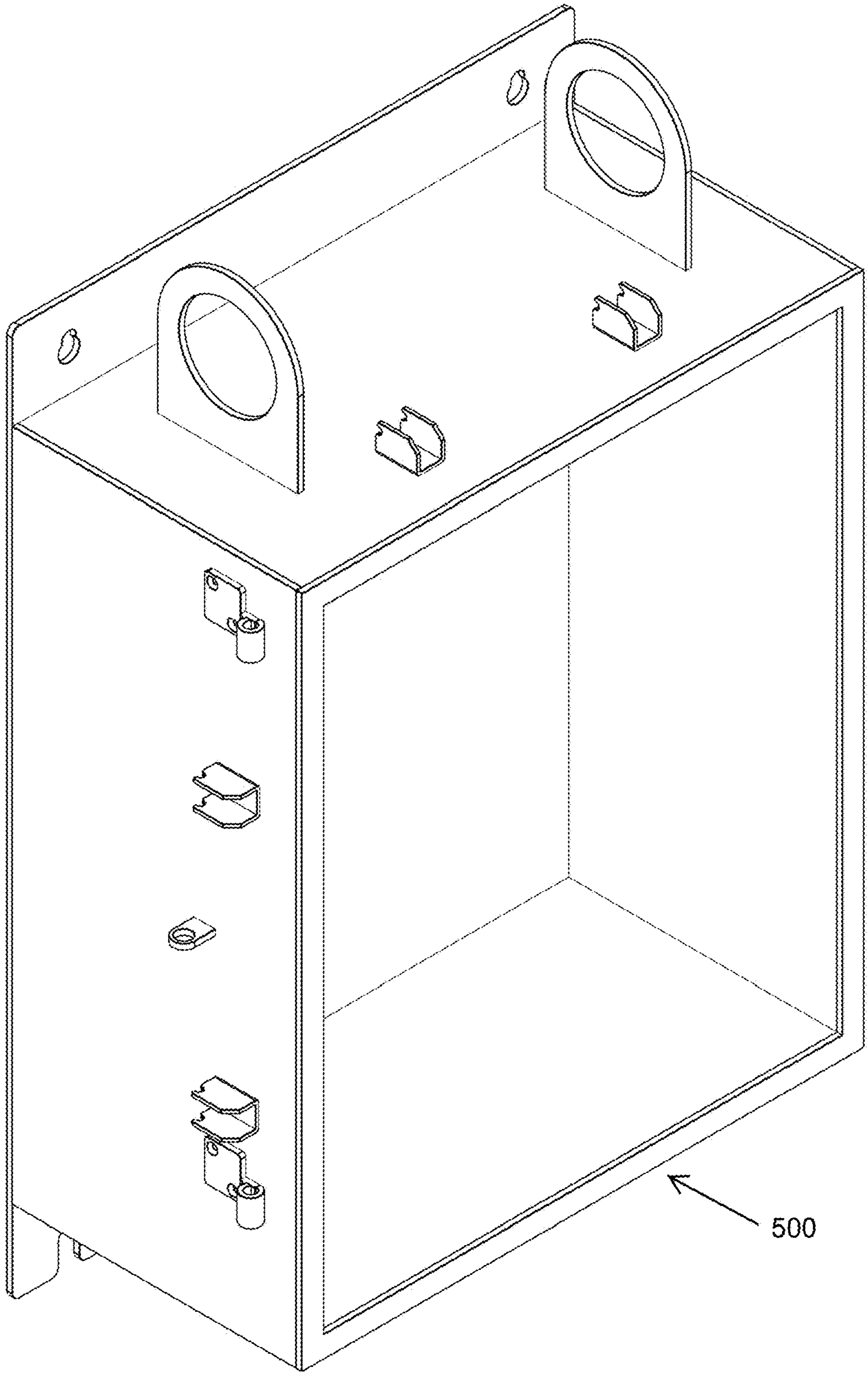
Figure 30:
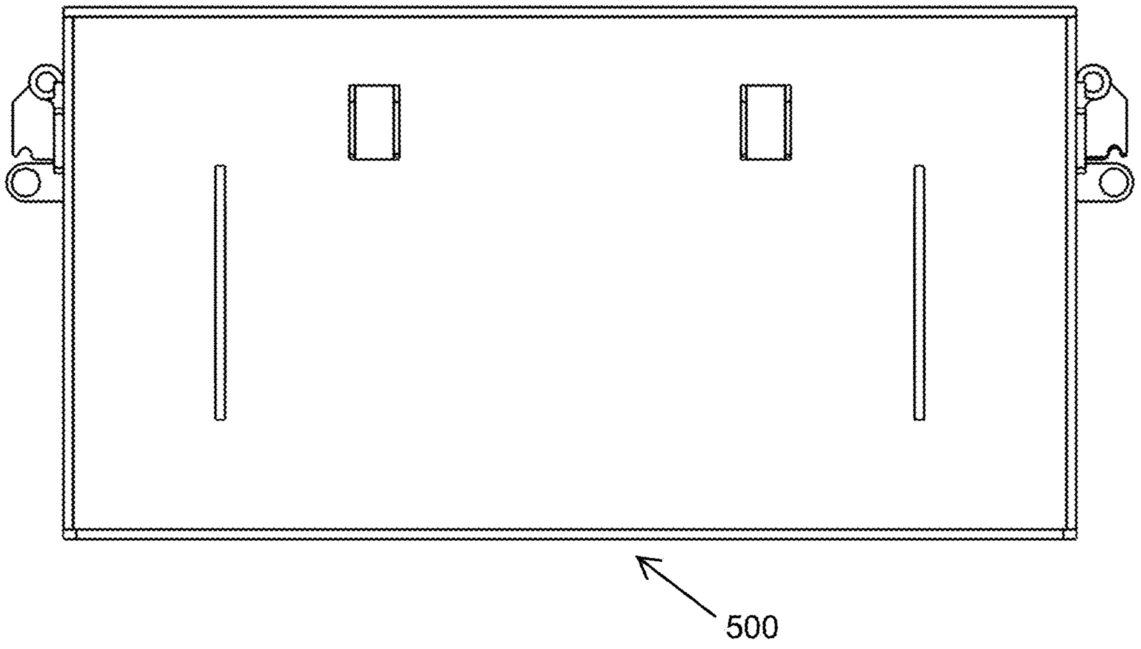
Figure 31:
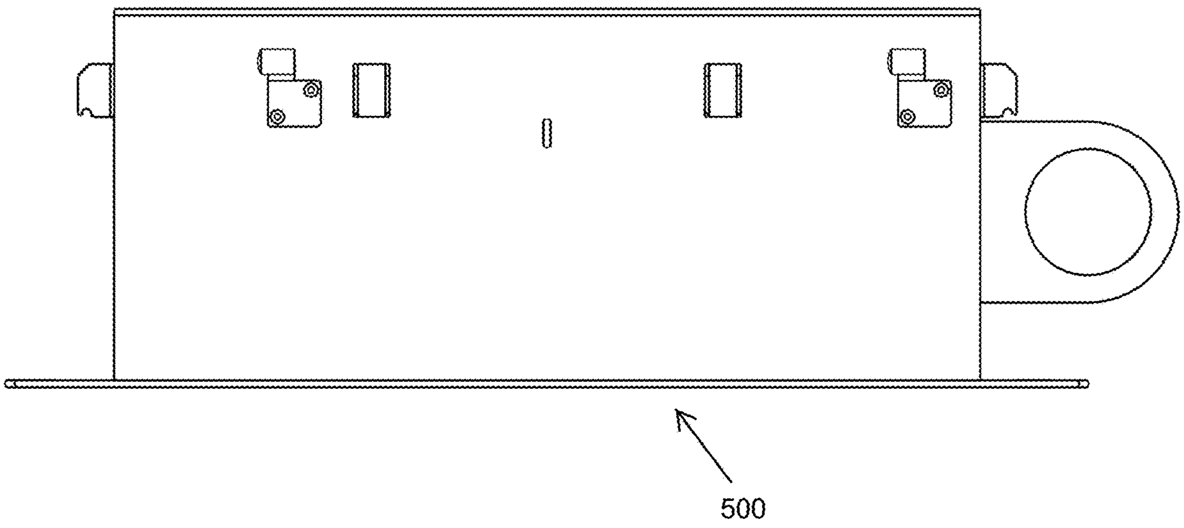
Figure 32:
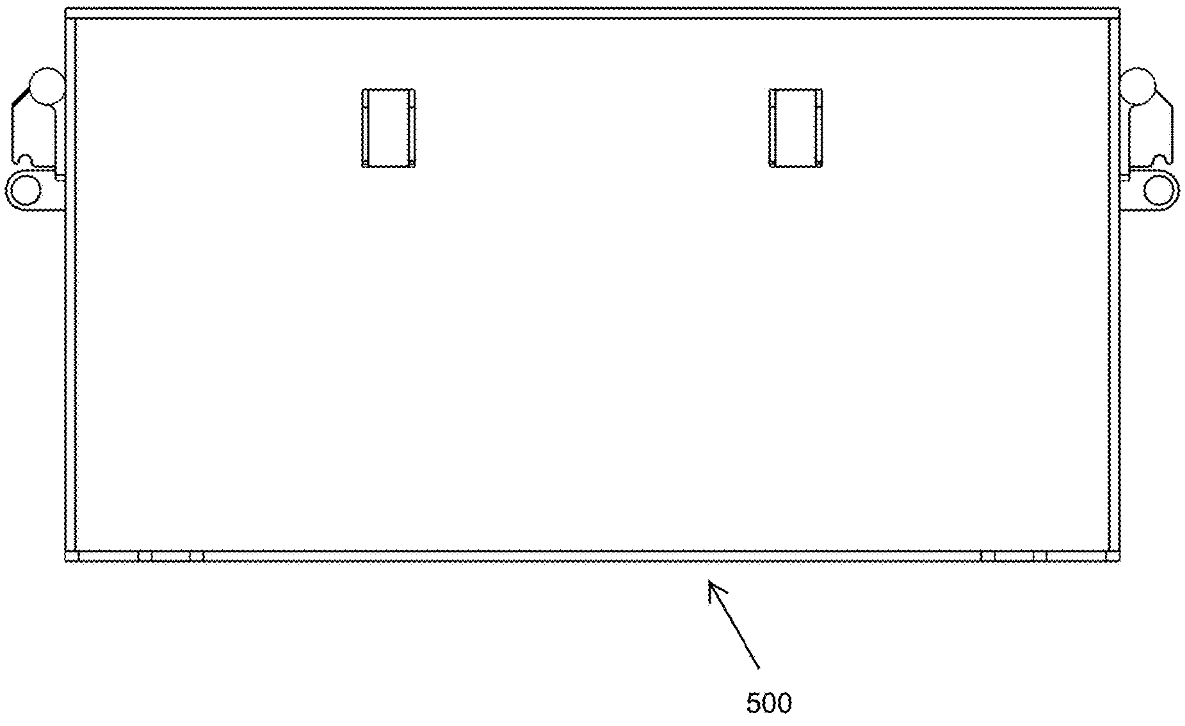
Figure 33:
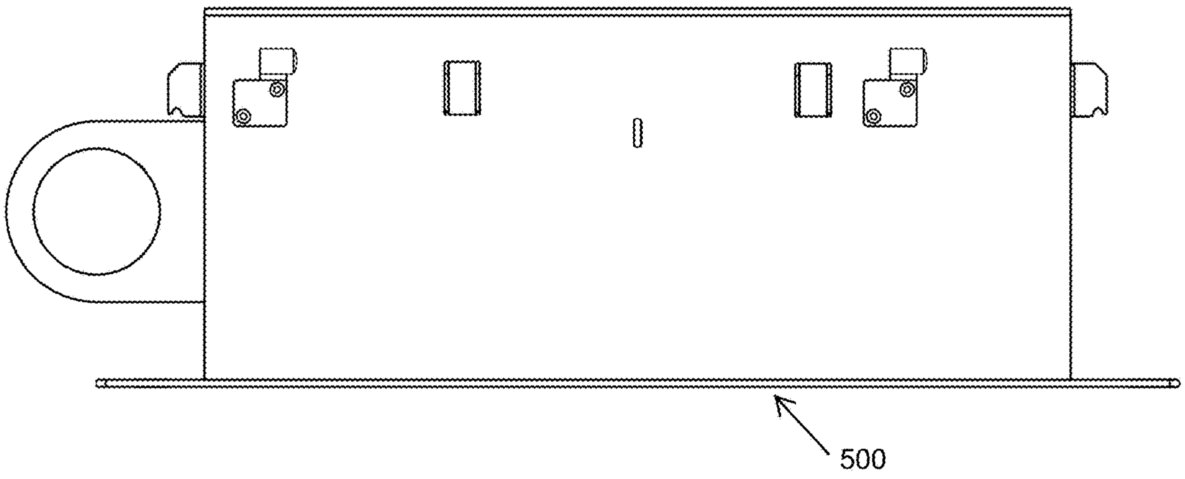
Figure 34:
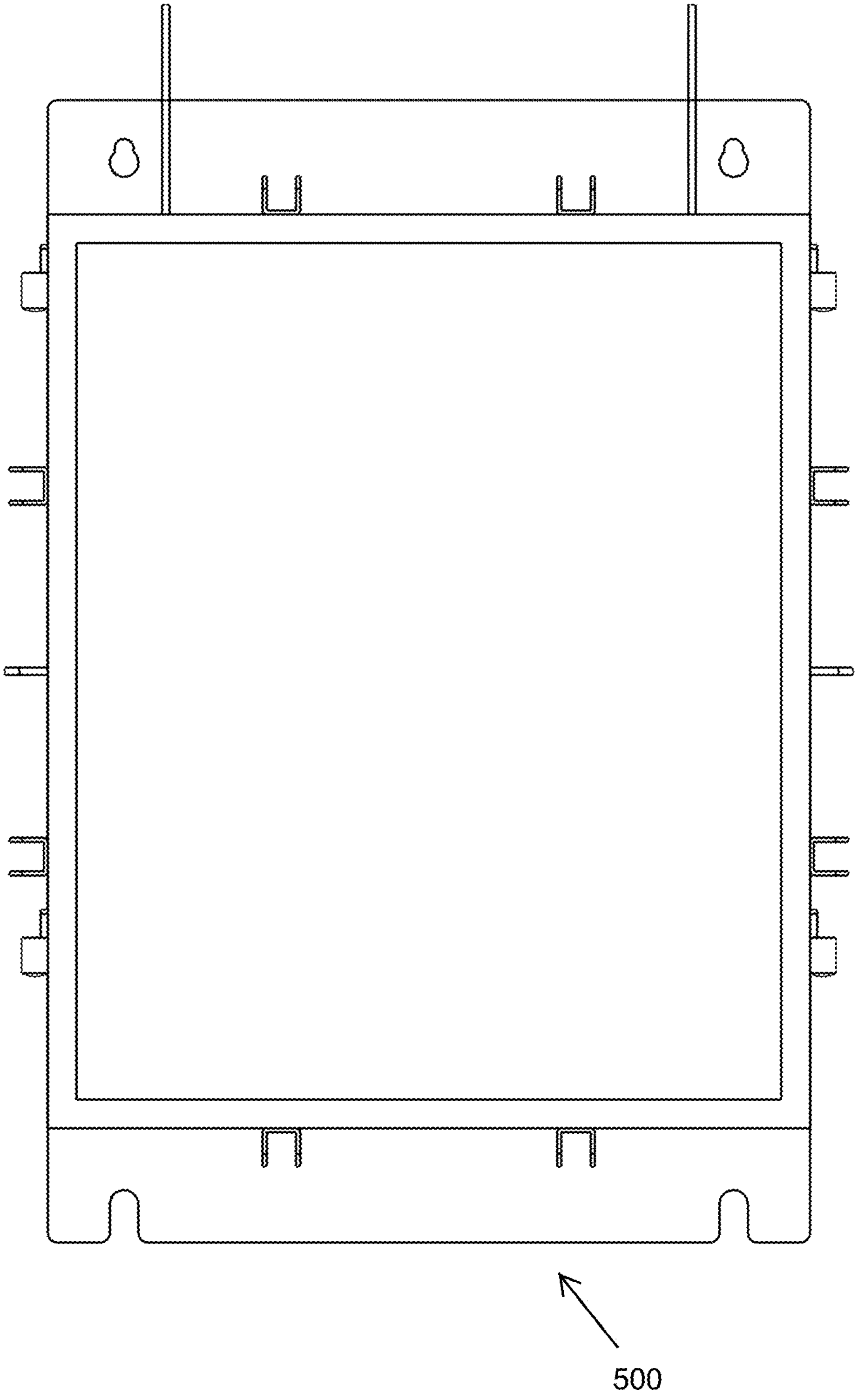
Figure 35:
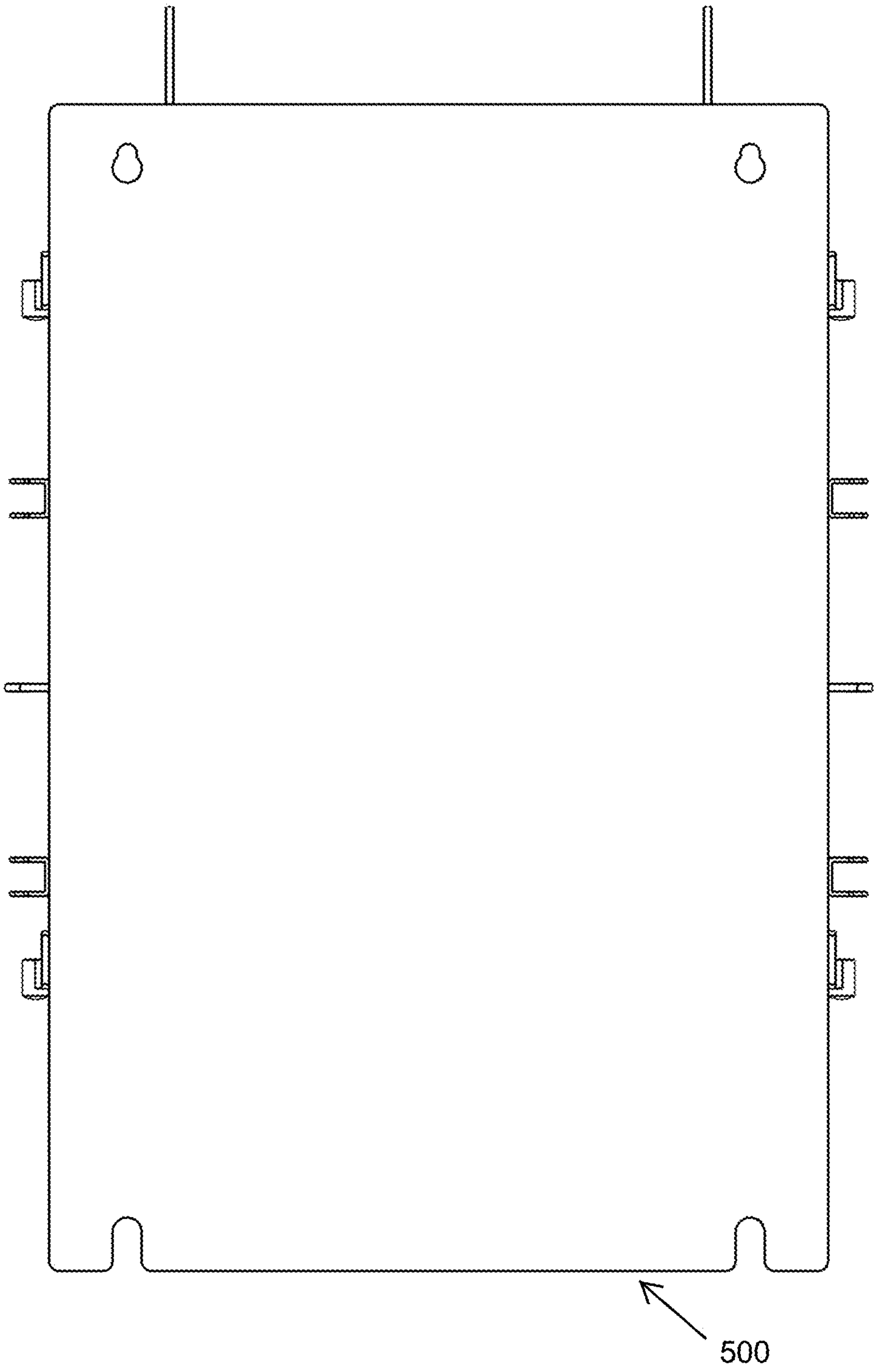

Turning to FIGS. 12-14, this application is also directed to an enclosure 400 with an ambidextrous lift-off hinge 405. Typically, an enclosure must be rotated 180 degrees to select hinged side, but this is not always possible, such as when the enclosure base is configured for specific cable and wire entry points. Enclosure 400 solves this issue.

The enclosure 400 has a base 500 and a door 600. To ease in moving and manipulating the enclosure 400, the door 600 may have at least one handle 670 and the top base wall 525 may have at least one lift point 565. The base 500 has a rear wall 560 that can extend above the top base wall 525 and below the bottom base wall 535 to form an upper rear wall flange **560*a* and a lower rear wall flange 560*b*. The upper rear wall flange 560*a* and lower rear wall flange 560*b* can have apertures and/or slots for mounting the enclosure 400. The enclosure 400 may also have a gasket between the base 500 and door 600. When the door 600 is mounted on and clamped to the base 500**, the gasket helps the enclosure maintain air and water tightness.

The door 600 has a hinge side 605 and a clamp side 610. The enclosure 400 is configured such that the door 600 can be changed from left-handed hinged to right-handed hinged, and vice-versa, by rotating the door 600 180 degrees relative to the base 500. Thereby, swapping (interchanging) the locations of the hinge side 605 and clamp side 610 of the door 600 relative to the base 500.

The hinge side 605 of the door 600 has a right-handed set of door hinges 615 comprising a first right-handed door hinge **615*a* and a second right-handed door hinge 615*b*. The hinge side 605 also has a left-handed set of door hinges 620 comprising a first left-handed door hinge 620*a* and a second left-handed door hinge 620*b***.

The exterior of the right base wall 520 has right-handed base wall hinges 545 comprising a first right-handed base wall hinge **545*a* and a second right-handed base wall hinge 545*b*. The exterior of the left base wall 505 has left-handed base wall hinges 555 comprising a first left-handed base wall hinge 555*a* and a second left-handed base wall hinge 555*b***.

In some embodiments, the first right-handed door hinge **615*a* is located between the first side 650 of door 600 and the second left-handed door hinge 620*b*, with the first right-handed door hinge 615***a* being positioned closer to the first side 650 than to the second left-handed door hinge 620.

The first left-handed door hinge 620*a* is located between the second side 660 of door 600 and the second right-handed door hinge 615*b*, with the first left-handed door hinge 620*b* being located closer to the second side 660 than to the second right-handed door hinge 615*b*. Further, the second left-handed door hinge 620*b* is located between the first right-handed door hinge 615*a* and the second right-handed door hinge 615*b*, with the second left-handed door hinge 620*b* being located closer to the first right-handed door hinge 615*a* and the second right-handed door hinge 615*b*.

In some embodiments, right-handed door hinges 615 and left-handed door hinges 620 have pins that protrude from and designed to interface with corresponding recesses in the respective right-handed base wall hinges 545 and left-handed base wall hinges 555, when door 600 is mounted on base 500. In some embodiments, the pin of the first right-handed door hinge 615*a* is facing toward the pin of the second left-handed-door hinge 620*b*. Further, the pin of the second right-handed door hinge 615*b* is facing toward the pin of the first left-handed door hinge 620*a*. It is also contemplated that the right-handed door hinges 615 and left-handed door hinges 620 could have the recesses for interfacing with corresponding pins formed on the right-handed base wall hinges 545 and left-handed base wall hinges 555, when door 600 is mounted on base 500.

The clamp side 610 of the door 600 has at least one clamp side clamp 640 mounted on the front 645 of the door 600, such that each clamp side clamp 640 runs along the clamp side 610 to interface with at least one corresponding lug on the base 500. When the enclosure 400 is in a right-handed hinged configuration, the clamp side clamp 640 is positioned to interface with a left base wall lug 510 on the exterior of the left base wall 505. Similarly, when the enclosure 400 is in a left-handed hinged configuration, the clamp side clamp 640 is positioned to interface with a right base wall lug 520 on the exterior of the right base wall 515. Since the clamp side clamp 640 is mounted on the door 600 and must be capable of interfacing with both the left base wall lug 510 and the right base wall lug 520, as determined by the hinged-side mounting configuration, the left base wall lug 510 and right base wall lug 520 are symmetrically located on the left base wall 505 and the right base wall 515.

Some embodiments of door 600 have two clamp side clamps 640 with each being positioned to interface with corresponding left base wall lugs 510 when door 600 is in a right-handed hinged configuration. Along the same lines, the two clamp side clamps 640 are positioned to interface with corresponding right base wall lugs 520 when door 600 is in a left-handed hinged configuration.

A first side 650 of door 600 has at least one first side clamp 655 mounted on the front 645 of door 600 adjacent the first side 650, such that the first side clamp 655 runs along the first side 650 to interface with a corresponding lug on the base 500. When the enclosure 400 is in a left-handed hinged configuration, the first side clamp 655 is positioned to interface with a top base wall lug 530 on the exterior of the top base wall 525. Similarly, when the enclosure is in a right-handed hinged configuration, the first side clamp 655 is positioned to interface with a bottom base wall lug 540 on the exterior of the bottom base wall 535. Since the first side clamp 655 is mounted on the door 600 and must be capable of interfacing with both the top base wall lug 530 and the bottom base wall lug 540, as determined by the hinged-side mounting configuration, the top base wall lug 530 and bottom base wall lug 540 are symmetrically located on the top base wall 525 and bottom base wall 535.

Some embodiments of door 600 have two first side clamps 655 with each being positioned to interface with corresponding top base wall lugs 530 when door 600 is in a left-handed hinged configuration. Along the same lines, the two first side clamps 655 are positioned to interface with corresponding bottom base wall lugs 540 when door 600 is in a right-handed hinged configuration.

A second side 660 of door 600 is located opposite the first side 650 of door 600. Second side 660 has at least one second side clamp 665 mounted on the front 645 of door 600 adjacent the second side 660, such that the second side clamp 665 runs along the second side 660 to interface with a corresponding lug on the base 500. When the enclosure 400 is in a left-handed hinged configuration, the second side clamp 665 is positioned to interface with the bottom base wall lug 540. Further, when the enclosure 400 is in a right-handed hinged configuration, the second side clamp 665 is positioned to interface with the top base wall lug 530.

Some embodiments of door 600 have two second side clamps 665 with each being positioned to interface with corresponding bottom base wall lugs 540 when door 600 is in a left-handed hinged configuration. Along the same lines, the two second side clamps 665 are positioned to interface with corresponding top base wall lugs 530 when door 600 is in a right-handed hinged configuration.

Further, since the first side clamp 655 and the second side clamp 665 both must be capable of interfacing with symmetrically placed top base wall lug 530 and bottom base wall lug 540, as determined by the hinged-side mounting configuration, then the first side clamp 655 and second side clamp 665 are also symmetrically located. Thus, the first side clamp 655 and second side clamp 665 share symmetry with each other, as well as the top base wall lug 530 and bottom base wall lug 540.

Thus, the hinges and lugs of the base 500 are mirrored about a vertical axis at the enclosure's center point. This permits the door 600 in the right-handed hinged configuration to be removed, flipped, and placed back on for an immediate change to a left-handed hinged configuration, and vice-versa. This can be done at will without reorienting the base 500 and does not require tools.

Because the door 600 has both left-handed hinges and right-handed hinges on the hinge side 605, in operation, the door 600 can be mounted on enclosure 400 in a left-handed hinged configuration by picking up door 600, lining up the left-handed hinges, namely, first left-handed door hinge 620*a* with first left-handed base wall hinge 555*a* and second left-handed door hinge 620*b* with second left-handed base wall hinge 555*b*, and lowering the door straight down to permit the left-handed components to fully seat. The door 600 can then be closed and latched in the new position.

The door 600 can then be switched to a right-handed hinged configuration simply by unlatching the door 600, opening the door 600, lifting up the door 600 to unseat the hinge components, rotating the door 180 degrees, lining up the right-handed hinges, namely, first right-handed door hinge 615*a* with the first right-handed base wall hinge 545*a* and the second right-handed door hinge 615*b* with the second right-handed base wall hinge 545*b*, and lowering the door straight down to permit the right-handed hinge components to fully seat. The door 600 can then be closed and latched in the new position. As can be seen, liftoff connections between the door 600 and base 500 hinges of the enclosure permit the handedness of the door 600 to be changed without requiring the use of tools.

As can be seen, enclosure 400 permits the customer to stock one enclosure 400 that can be deployed in either a right-handed hinged configuration or a left-handed hinged configuration at will.

While this invention has been described in conjunction with the specific embodiments described above, it is evident that many alternatives, combinations, modifications and variations are apparent to those skilled in the art. Accordingly, the preferred embodiments of this invention, as set forth above are intended to be illustrative only, and not in a limiting sense. Various changes can be made without departing from the spirit and scope of this invention. Combinations of the above embodiments and other embodiments will be apparent to those of skill in the art upon studying the above description and are intended to be embraced therein. Therefore, the scope of the present invention is defined by the appended claims, and all devices, processes, and methods that come within the meaning of the claims, either literally or by equivalence, are intended to be embraced therein.

The invention claimed is:

1. An enclosure with an ambidextrous hinge comprising:

a base and a door;

said door having a hinge side and a clamp side, with said clamp side being opposite said hinge side;

said hinge side of said door having a right-handed door hinges and left-handed door hinges;

said base having a right base wall and a left base wall, with the right base wall being opposite said left base wall, said right base wall having right-handed base wall hinges positioned to interface through a connection with said right-handed door hinges, when said door is mounted in a right-handed position;

said base having a left base wall having left-handed base wall hinges positioned to interface through a connection with said left-handed door hinges, when said door is mounted in a left-handed position;

wherein said door is rotatable between a closed position with respect to the base and an open position with respect to the base;

wherein said right-handed door hinges define a right axis about which the right-handed door hinges are adapted to rotate and along which the door may be moved relative to the base to mount or dismount the door from the right-handed position;

wherein said left-handed door hinges define a left axis about which the left-handed door hinges are adapted to rotate and along which the door may be moved relative to the base to mount or dismount the door from the left-handed position;

wherein said connections are adapted to permit the handedness of the door mounting to be changed from a first handedness without the use of tools by opening the door, moving the door relative to the base to dismount the door rotating said door 180 degrees relative to said base, and mounting said door back on said hinges in a second handedness configuration, with said first handedness configuration being the opposite of said second handedness configuration; and at least one hinge pin that is either a. captive and fixed within one of the base wall hinges and slidably removable from or one of the door hinges, or b. captive and fixed within one of the door hinges and slidably removable from or one of the base wall hinges.

2. The enclosure of claim 1, wherein said right-handed base wall hinges comprise a first right-handed base wall hinge and a second right-handed base wall hinge, and said left handed base wall hinges comprise a first left-handed base wall hinge and a second left-handed base wall hinge.

3. The enclosure of claim 1, where said right-handed door hinges comprise a first right-handed door hinge and a second right-handed door hinge; and said left-handed door hinges comprise a first left-handed door hinge and a second left-handed door hinge.

4. The enclosure of claim 1, wherein said clamp side of said door has a clamp side clamp that interfaces with a left base wall lug of said left base wall, when said door is in a right-handed hinged configuration, and said clamp side clamp interfaces with a right base wall lug of said right base wall, when said door is in a left-handed hinged configuration.

5. The enclosure of claim 1, wherein said door has a first side with a first side clamp that interfaces with a top base wall lug of a top base wall of said base, when said door is in a left-handed hinged configuration, and said first side clamp interfaces with a bottom base wall lug of a bottom base wall of said base, when said door is in a right-handed hinged configuration.

6. The enclosure of claim 1, wherein said door has a second side located opposite a first side of said door, said second side has a second side clamp that interfaces with a bottom base wall lug of a base wall of said base, when said door is in a left-handed hinged configuration, and said second side clamp interfaces with a top base wall lug of a top base wall of said base, when said door is in a right-handed hinged configuration.

* * * * *